United States Patent [19]
Mattela et al.

[11] Patent Number: 5,781,239
[45] Date of Patent: Jul. 14, 1998

[54] SYSTEM AND METHOD FOR PERFORMING AN OPTIMIZED INVERSE DISCRETE COSINE TRANSFORM WITH IMPROVED EFFICIENCY

[75] Inventors: Venkat Mattela, Sunnyvale; Srinivasa Malladi, San Jose, both of Calif.

[73] Assignee: LSI Logic Corporation, Milpitas, Calif.

[21] Appl. No.: 667,100

[22] Filed: Jun. 20, 1996

[51] Int. Cl.$^6$ .................................................. H04N 7/36
[52] U.S. Cl. .................. 348/415; 348/400; 348/403; 348/416; 348/417; 348/423; 348/699; 358/433; 364/725.02
[58] Field of Search ......................... 348/400, 403, 348/415, 416, 417, 423, 699; 358/433; 364/72, 725.02, 725

[56] References Cited

U.S. PATENT DOCUMENTS

| | | | |
|---|---|---|---|
| 4,394,774 | 7/1983 | Widergren et al. | 382/250 |
| 4,772,956 | 9/1988 | Roche et al. | 358/433 |
| 4,849,922 | 7/1989 | Riolfo et al. | 364/725 |
| 4,881,192 | 11/1989 | Woudsma et al. | 364/725 |
| 5,319,724 | 6/1994 | Blonstein et al. | 382/248 |
| 5,323,187 | 6/1994 | Park | 348/405 |
| 5,394,349 | 2/1995 | Eddy | 364/725 |
| 5,416,522 | 5/1995 | Igarashi | 348/416 |

Primary Examiner—Tommy P. Chin
Assistant Examiner—Frank Snow
Attorney, Agent, or Firm—Conley, Rose & Tayon; Jeffery C. Hood

[57] ABSTRACT

An MPEG decoder system and method an MPEG decoder system and method for decoding frames of a video sequence. The MPEG decoder includes IDCT computation logic which computes the IDCT with improved performance. The IDCT logic performs the inverse DCT based on the Chen algorithm for IDCT computation. The system and method of the present invention efficiently utilizes properties of the coefficients in optimizing the matrix multiply functions, thus providing improved performance. Chen's algorithm is commonly used to perform the two-dimensional IDCT. According to the Chen algorithm, the transform matrix I is defined as:

$$[I] = [Q] \times [P]$$

The Chen algorithm calculation can be written as:

$$f = (Q \times F^T \times Q \times P)^T \times P$$

The Q matrix is a diagonal matrix which has diagonal non-zero values, with the remainder of the values being 0. The P matrix includes a plurality of values which are the opposite sign of each other. The system and method uses the diagonal nature of the Q matrix, the similarities or symmetry in matrix coefficients in the P matrix, as well as the nature and bit representation of the P matrix coefficients, to perform more efficient IDCT computations.

20 Claims, 19 Drawing Sheets

Matric Multiplication in IDCT using Optimal Number of Multipliers.

$$[P] = \begin{bmatrix} 1 & 1 & 1 & 1 & 1 & 1 & 1 & 1 \\ a & r(a+1) & r(a-1) & 1 & -1 & -r(a-1) & -r(a+1) & -a \\ b & 1 & -1 & -b & -b & -1 & 1 & b \\ c & -r(c-1) & -r(c+1) & -1 & 1 & r(c+1) & r(c-1) & -c \\ 1 & -1 & -1 & 1 & 1 & -1 & -1 & 1 \\ 1 & -r(c+1) & r(c-1) & c & -c & -r(c-1) & r(c+1) & -1 \\ 1 & -b & b & -1 & -1 & b & -b & 1 \\ 1 & -r(a-1) & r(a+1) & -a & a & -r(a+1) & r(a-1) & -1 \end{bmatrix}$$

Fig. 5

$$[Q] = \begin{bmatrix} \frac{1}{\sqrt{2}} & 0 & 0 & 0 & 0 & 0 & 0 & 0 \\ 0 & \frac{1}{\sqrt{a^2+1}} & 0 & 0 & 0 & 0 & 0 & 0 \\ 0 & 0 & \frac{1}{\sqrt{b^2+1}} & 0 & 0 & 0 & 0 & 0 \\ 0 & 0 & 0 & \frac{1}{\sqrt{c^2+1}} & 0 & 0 & 0 & 0 \\ 0 & 0 & 0 & 0 & \frac{1}{\sqrt{2}} & 0 & 0 & 0 \\ 0 & 0 & 0 & 0 & 0 & \frac{1}{\sqrt{c^2+1}} & 0 & 0 \\ 0 & 0 & 0 & 0 & 0 & 0 & \frac{1}{\sqrt{b^2+1}} & 0 \\ 0 & 0 & 0 & 0 & 0 & 0 & 0 & \frac{1}{\sqrt{a^2+1}} \end{bmatrix}$$

Fig. 6

$$\frac{1}{\sqrt{2}} = e$$

$$\frac{1}{\sqrt{a^2+1}} = f$$

$$\frac{1}{\sqrt{b^2+1}} = g$$

$$\frac{1}{\sqrt{c^2+1}} = h$$

Q matrix $$Q \begin{bmatrix} e & 0 & 0 & 0 & 0 & 0 & 0 & 0 \\ 0 & f & 0 & 0 & 0 & 0 & 0 & 0 \\ 0 & 0 & g & 0 & 0 & 0 & 0 & 0 \\ 0 & 0 & 0 & h & 0 & 0 & 0 & 0 \\ 0 & 0 & 0 & 0 & e & 0 & 0 & 0 \\ 0 & 0 & 0 & 0 & 0 & h & 0 & 0 \\ 0 & 0 & 0 & 0 & 0 & 0 & g & 0 \\ 0 & 0 & 0 & 0 & 0 & 0 & 0 & f \end{bmatrix}$$

Fig. 7

$$F^T \begin{bmatrix} F_{00} & F_{10} & F_{20} & F_{30} & F_{40} & F_{50} & F_{60} & F_{70} \\ F_{01} & F_{11} & F_{21} & F_{31} & F_{41} & F_{51} & F_{61} & F_{71} \\ F_{02} & F_{12} & F_{22} & F_{32} & F_{42} & F_{52} & F_{62} & F_{72} \\ F_{03} & F_{13} & F_{23} & F_{33} & F_{43} & F_{53} & F_{63} & F_{73} \\ F_{04} & F_{14} & F_{24} & F_{34} & F_{44} & F_{54} & F_{64} & F_{74} \\ F_{05} & F_{15} & F_{25} & F_{35} & F_{45} & F_{55} & F_{65} & F_{75} \\ F_{06} & F_{16} & F_{26} & F_{36} & F_{46} & F_{56} & F_{66} & F_{76} \\ F_{07} & F_{17} & F_{27} & F_{37} & F_{47} & F_{57} & F_{67} & F_{77} \end{bmatrix}$$

Fig. 8

$$Q \times F^T = \begin{bmatrix} e \cdot F_{00} & e \cdot F_{10} & e \cdot F_{20} & e \cdot F_{30} & e \cdot F_{40} & e \cdot F_{50} & e \cdot F_{60} & e \cdot F_{70} \\ f \cdot F_{01} & f \cdot F_{11} & f \cdot F_{21} & f \cdot F_{31} & f \cdot F_{41} & f \cdot F_{51} & f \cdot F_{61} & f \cdot F_{71} \\ g \cdot F_{02} & g \cdot F_{12} & g \cdot F_{22} & g \cdot F_{32} & g \cdot F_{42} & g \cdot F_{52} & g \cdot F_{62} & g \cdot F_{72} \\ h \cdot F_{03} & h \cdot F_{13} & h \cdot F_{23} & h \cdot F_{33} & h \cdot F_{43} & h \cdot F_{53} & h \cdot F_{63} & h \cdot F_{73} \\ e \cdot F_{04} & e \cdot F_{14} & e \cdot F_{24} & e \cdot F_{34} & e \cdot F_{44} & e \cdot F_{54} & e \cdot F_{64} & e \cdot F_{74} \\ h \cdot F_{05} & h \cdot F_{15} & h \cdot F_{25} & h \cdot F_{35} & h \cdot F_{45} & h \cdot F_{55} & h \cdot F_{65} & h \cdot F_{75} \\ g \cdot F_{06} & g \cdot F_{16} & g \cdot F_{26} & g \cdot F_{36} & g \cdot F_{46} & g \cdot F_{56} & g \cdot F_{66} & g \cdot F_{76} \\ f \cdot F_{07} & f \cdot F_{17} & f \cdot F_{27} & f \cdot F_{37} & f \cdot F_{47} & f \cdot F_{57} & f \cdot F_{67} & f \cdot F_{77} \end{bmatrix}$$

Fig. 9

$$(Q \times F)^T \times Q =$$

$$\begin{bmatrix}
e{\cdot}e{\cdot}F_{00} & e{\cdot}f{\cdot}F_{10} & e{\cdot}g{\cdot}F_{20} & e{\cdot}h{\cdot}F_{30} & e{\cdot}e{\cdot}F_{40} & e{\cdot}h{\cdot}F_{50} & e{\cdot}g{\cdot}F_{60} & e{\cdot}f{\cdot}F_{70} \\
e{\cdot}f{\cdot}F_{01} & f{\cdot}f{\cdot}F_{11} & f{\cdot}g{\cdot}F_{21} & f{\cdot}h{\cdot}F_{31} & e{\cdot}f{\cdot}F_{41} & f{\cdot}h{\cdot}F_{51} & f{\cdot}g{\cdot}F_{61} & f{\cdot}f{\cdot}F_{71} \\
e{\cdot}g{\cdot}F_{02} & f{\cdot}g{\cdot}F_{12} & g{\cdot}g{\cdot}F_{22} & g{\cdot}h{\cdot}F_{32} & e{\cdot}g{\cdot}F_{42} & g{\cdot}h{\cdot}F_{52} & g{\cdot}g{\cdot}F_{62} & f{\cdot}g{\cdot}F_{72} \\
e{\cdot}h{\cdot}F_{03} & f{\cdot}h{\cdot}F_{13} & g{\cdot}h{\cdot}F_{23} & h{\cdot}h{\cdot}F_{33} & e{\cdot}h{\cdot}F_{43} & h{\cdot}h{\cdot}F_{53} & g{\cdot}h{\cdot}F_{63} & f{\cdot}h{\cdot}F_{73} \\
e{\cdot}e{\cdot}F_{04} & e{\cdot}f{\cdot}F_{14} & h{\cdot}g{\cdot}F_{24} & e{\cdot}h{\cdot}F_{34} & e{\cdot}e{\cdot}F_{44} & e{\cdot}h{\cdot}F_{54} & h{\cdot}g{\cdot}F_{64} & e{\cdot}f{\cdot}F_{74} \\
e{\cdot}h{\cdot}F_{05} & f{\cdot}h{\cdot}F_{15} & g{\cdot}h{\cdot}F_{25} & h{\cdot}h{\cdot}F_{35} & e{\cdot}h{\cdot}F_{45} & h{\cdot}h{\cdot}F_{55} & g{\cdot}h{\cdot}F_{65} & f{\cdot}h{\cdot}F_{75} \\
e{\cdot}g{\cdot}F_{06} & f{\cdot}g{\cdot}F_{16} & g{\cdot}g{\cdot}F_{26} & g{\cdot}h{\cdot}F_{36} & e{\cdot}g{\cdot}F_{46} & g{\cdot}h{\cdot}F_{56} & g{\cdot}g{\cdot}F_{66} & f{\cdot}g{\cdot}F_{76} \\
e{\cdot}f{\cdot}F_{07} & f{\cdot}f{\cdot}F_{17} & f{\cdot}g{\cdot}F_{27} & f{\cdot}h{\cdot}F_{37} & e{\cdot}f{\cdot}F_{47} & f{\cdot}h{\cdot}F_{57} & f{\cdot}g{\cdot}F_{67} & f{\cdot}f{\cdot}F_{77}
\end{bmatrix}$$

[FxP]

trans[FxP]

P output

Matrix Multiplication in IDCT $$[P] = \begin{bmatrix} 1 & 1 & 1 & 1 & 1 & 1 & 1 & 1 \\ a & r(a+1) & r(a-1) & 1 & -1 & -r(a-1) & -r(a+1) & -a \\ b & 1 & -1 & -b & -b & -1 & 1 & b \\ c & -r(c-1) & -r(c+1) & -1 & 1 & r(c+1) & r(c-1) & -c \\ 1 & -1 & -1 & 1 & 1 & -1 & -1 & 1 \\ 1 & -r(c+1) & r(c-1) & c & -c & -r(c-1) & r(c+1) & -1 \\ 1 & -b & b & -1 & -1 & b & -b & 1 \\ 1 & -r(a-1) & r(a+1) & -a & a & -r(a+1) & r(a-1) & -1 \end{bmatrix}$$

Fig. 13

First Stage IDCT computations for one row

| | | | | | | | | | | | | | | |
|---|---|---|---|---|---|---|---|---|---|---|---|---|---|---|
| f00 = F0x1 | + | F1xa | + | F2xb | + | F3xc | + | F4x1 | + | F5x1 | + | F6x1 | + | F7x1 |
| f01 = F0x1 | + | F1xr(a+1) | + | F2x1 | + | F3x-r(c-1) | + | F4x-1 | + | F5x-r(c+1) | + | F6x-b | + | F7x-r(a-1) |
| f02 = F0x1 | + | F1xr(a-1) | + | F2x-1 | + | F3xr(c+1) | + | F4x-1 | + | F5xr(c-1) | + | F6xb | + | F7xr(a+1) |
| f03 = F0x1 | + | F1x1 | + | F2x-b | + | F3x-1 | + | F4x1 | + | F5xc | + | F6x-1 | + | F7x-a |
| f04 = F0x1 | + | F1x-1 | + | F2x-b | + | F3x1 | + | F4x1 | + | F5x-c | + | F6x-1 | + | F7xa |
| f05 = F0x1 | + | F1x-r(a-1) | + | F2x-1 | + | F3xr(c+1) | + | F4x-1 | + | F5x-r(c-1) | + | F6xb | + | F7x-r(a+1) |
| f06 = F0x1 | + | F1x-r(a+1) | + | F2x1 | + | F3xr(c-1) | + | F4x-1 | + | F5x-r(c+1) | + | F6x-b | + | F7xr(a-1) |
| f07 = F0x1 | + | F1x-a | + | F2xb | + | F3x-c | + | F4x1 | + | F5x-1 | + | F6x1 | + | F7x-1 |

Fig. 14

Matric Multiplication in IDCT using Optimal Number of Multipliers.

P matrix constants and their bit representation

| Coeff. | 2^2 | 2^1 | 2^0 | 2^-1 | 2^-2 | 2^-3 | 2^-4 | 2^-5 | 2^-6 | 2^-7 | 2^-8 |
|---|---|---|---|---|---|---|---|---|---|---|---|
| 1 | 0 | 0 | 1 | 0 | 0 | 0 | 0 | 0 | 0 | 0 | 0 |
| a | 1 | 0 | 1 | 0 | 0 | 0 | 0 | 0 | 1 | 0 | 1 |
| b | 0 | 1 | 0 | 1 | 1 | 0 | 0 | 1 | 0 | 1 | 1 |
| c | 0 | 0 | 1 | 0 | 1 | 0 | 0 | 0 | 0 | 0 | 0 |
| r(a+1) | 1 | 0 | 0 | 0 | 1 | 0 | 1 | 1 | 0 | 1 | 1 |
| r(a-1) | 0 | 1 | 0 | 1 | 1 | 0 | 1 | 0 | 0 | 0 | 1 |
| r(c-1) | 0 | 0 | 0 | 0 | 1 | 0 | 1 | 1 | 0 | 1 | 0 |
| r(c+1) | 0 | 0 | 1 | 0 | 1 | 0 | 0 | 0 | 1 | 0 | 0 |

Grp1 -> 2^-8
Grp2 -> 2^-1, 2^-7
Grp3 -> 2^-3, 2^-4, 2^-6
Grp4 -> 2^0, 2^-5
Grp5 -> 2^-2
Grp6 -> 2^1, 2^2

Fig. 16

High-level Adder Optimizations

Optimized Multiplier Construction

Mult 1 Optimizations

P matrix

| Multiplicand | Col | $M_{X1}$ | $M_{X2}$ | $M_{X3}$ | $M_{X4}$ | $M_{X5}$ | $M_{X6}$ |
|---|---|---|---|---|---|---|---|
| 1 | 000 | 0 | 0 | 0 | {i,8'bo} | 0 | 0 |
| γ(a+1) | 001 | {i} | {i,1'bo} | 0 | 0 | 0 | {i,10'bo} |
| 1 | 010 | 0 | 0 | 0 | {i,8'bo} | 0 | 0 |
| γ(c-1) | 011 | 0 | {i,1'bo} | {i,4'bo} | {i,3'bo} | {i,6'bo} | 0 |
| 1 | 100 | 0 | 0 | {i,2'bo} | {i,8'bo} | 0 | 0 |
| γ(c+1) | 101 | 0 | {i,1'bo} | {i,5'bo} | {i,3'bo} | {i,6'bo} | 0 |
| b | 110 | 0 | 0 | {i,4'bo} | {i,3'bo} | {i,6'bo} | {i,9'bo} |
| γ(a-1) | 111 | {i} | {i,7'bo} | {i,4'bo} | {i,3'bo} | {i,6'bo} | {i,9'bo} |

Notes:
1. {i,x'bo} means input shifted left by 'x'
   {i,6'bo} means input shifted left by 6 bits
2. Muxes produce zero when 'p' constant has a zero at that bit position.
3. The above table is for 'mult1', 302a in Figure 15

Fig. 19

SYSTEM AND METHOD FOR PERFORMING AN OPTIMIZED INVERSE DISCRETE COSINE TRANSFORM WITH IMPROVED EFFICIENCY

INCORPORATION BY REFERENCE

The following references are hereby incorporated by reference.

The ISO/IEC MPEG specification referred to as ISO/IEC 13818 is hereby incorporated by reference in its entirety.

1. Field of the Invention

The present invention relates generally to digital video compression, and more particularly to an MPEG decoder system for performing the inverse discrete cosine transform (IDCT) according to the Chen algorithm with improved efficiency and reduced computational and hardware requirements.

2. Description of the Related Art

Full-motion digital video requires a large amount of storage and data transfer bandwidth. Thus, video systems use various types of video compression algorithms to reduce the amount of necessary storage and transfer bandwidth. In general, different video compression methods exist for still graphic images and for full-motion video. Intraframe compression methods are used to compress data within a still image or single frame using spatial redundancies within the frame. Interframe compression methods are used to compress multiple frames, i.e., motion video, using the temporal redundancy between the frames. Interframe compression methods are used exclusively for motion video, either alone or in conjunction with intraframe compression methods.

Intraframe or still image compression techniques generally use frequency domain techniques, such as the discrete cosine transform (DCT). Intraframe compression typically uses the frequency characteristics of a picture frame to efficiently encode a frame and remove spatial redundancy. Examples of video data compression for still graphic images are JPEG (Joint Photographic Experts Group) compression and RLE (run-length encoding). JPEG compression is a group of related standards that use the discrete cosine transform (DCT) to provide either lossless (no image quality degradation) or lossy (imperceptible to severe degradation) compression. Although JPEG compression was originally designed for the compression of still images rather than video, JPEG compression is used in some motion video applications. The RLE compression method operates by testing for duplicated pixels in a single line of the bit map and storing the number of consecutive duplicate pixels rather than the data for the pixels themselves.

In contrast to compression algorithms for still images, most video compression algorithms are designed to compress full motion video. As mentioned above, video compression algorithms for motion video use a concept referred to as interframe compression to remove temporal redundancies between frames. Interframe compression involves storing only the differences between successive frames in the data file. Interframe compression stores the entire image of a key frame or reference frame, generally in a moderately compressed format. Successive frames are compared with the key frame, and only the differences between the key frame and the successive frames are stored. Periodically, such as when new scenes are displayed, new key frames are stored, and subsequent comparisons begin from this new reference point. It is noted that the interframe compression ratio may be kept constant while varying the video quality. Alternatively, interframe compression ratios may be content-dependent, i.e., if the video clip being compressed includes many abrupt scene transitions from one image to another, the compression is less efficient. Examples of video compression which use an interframe compression technique are MPEG, DVI and Indeo, among others.

MPEG Background

A compression standard referred to as MPEG (Moving Pictures Experts Group) compression is a set of methods for compression and decompression of full motion video images which uses the interframe and intraframe compression techniques described above. MPEG compression uses both motion compensation and discrete cosine transform (DCT) processes, among others, and can yield compression ratios of more than 200:1.

The two predominant MPEG standards are referred to as MPEG-1 and MPEG-2. The MPEG-1 standard generally concerns inter-field data reduction using block-based motion compensation prediction (MCP), which generally uses temporal differential pulse code modulation (DPCM). The MPEG-2 standard is similar to the MPEG-1 standard, but includes extensions to cover a wider range of applications, including interlaced digital video such as high definition television (HDTV).

Interframe compression methods such as MPEG are based on the fact that, in most video sequences, the background remains relatively stable while action takes place in the foreground. The background may move, but large portions of successive frames in a video sequence are redundant. MPEG compression uses this inherent redundancy to encode or compress frames in the sequence.

An MPEG stream includes three types of pictures, referred to as the Intra (I) frame, the Predicted (P) frame, and the Bi-directional Interpolated (B) frame. The I or Intraframes contain the video data for the entire frame of video and are typically placed every 10 to 15 frames. Intraframes provide entry points into the file for random access, and are generally only moderately compressed. Predicted frames are encoded with reference to a past frame, i.e., a prior Intraframe or Predicted frame. Thus P frames only include changes relative to prior I or P frames. In general, Predicted frames receive a fairly high amount of compression and are used as references for future Predicted frames. Thus, both I and P frames are used as references for subsequent frames. Bi-directional pictures include the greatest amount of compression and require both a past and a future reference in order to be encoded. Bi-directional frames are never used as references for other frames.

In general, for the frame(s) following a reference frame, i.e., P and B frames that follow a reference I or P frame, only small portions of these frames are different from the corresponding portions of the respective reference frame. Thus, for these frames, only the differences are captured, compressed and stored. The differences between these frames are typically generated using motion vector estimation logic, as discussed below.

When an MPEG encoder receives a video file or bitstream, the MPEG encoder generally first creates the I frames. The MPEG encoder may compress the I frame using an intraframe lossless compression technique. After the I frames have been created, the MPEG encoder divides respective frames into a grid of 16×16 pixel squares called macroblocks. The respective frames are divided into macroblocks in order to perform motion estimation/compensation. Thus, for a respective target picture or frame, i.e., a frame being encoded, the encoder searches for an exact, or near exact, match between the target picture macroblock and a block in a neighboring picture referred to as a search frame. For a target P frame the encoder searches in a prior I or P frame. For a target B frame, the encoder searches in a prior or subsequent I or P frame. When a match is found, the encoder transmits a vector movement code or motion vector. The vector movement code or motion vector only includes information on the difference between the search frame and the respective target picture. The blocks in target pictures that have no change relative to the block in the reference picture or I frame are ignored. Thus the amount of data that is actually stored for these frames is significantly reduced.

After motion vectors have been generated, the encoder then encodes the changes using spatial redundancy. Thus, after finding the changes in location of the macroblocks, the MPEG algorithm further calculates and encodes the difference between corresponding macroblocks. Encoding the difference is accomplished through a math process referred to as the discrete cosine transform or DCT. This process divides the macroblock into four sub blocks, seeking out changes in color and brightness. Human perception is more sensitive to brightness changes than color changes. Thus the MPEG algorithm devotes more effort to reducing color space rather than brightness.

For frames which are used as references for other frames, the MPEG encoder is required to reverse the quantization and DCT transform on these blocks in order to recover the resultant pixel data. This resultant pixel data is used for motion estimation on subsequent frames, such as P and B frames. Thus MPEG encoders generally include inverse quantization logic as well as inverse DCT logic.

Therefore, MPEG compression is based on two types of redundancies in video sequences, these being spatial, which is the redundancy in an individual frame, and temporal, which is the redundancy between consecutive frames. Spatial compression is achieved by considering the frequency characteristics of a picture frame. Each frame is divided into non-overlapping blocks, and each block is transformed via the discrete cosine transform (DCT). After the transformed blocks are converted to the "DCT domain", each entry in the transformed block is quantized with respect to a set of quantization tables. The quantization step for each entry can vary, taking into account the sensitivity of the human visual system (HVS)} to the frequency. Since the HVS is more sensitive to low frequencies, most of the high frequency entries are quantized to zero. In this step where the entries are quantized, information is lost and errors are introduced to the reconstructed image. Run length encoding is used to transmit the quantized values. To further enhance compression, the blocks are scanned in a zig-zag ordering that scans the lower frequency entries first, and the non-zero quantized values, along with the zero run lengths, are entropy encoded.

As discussed above, temporal compression makes use of the fact that most of the objects remain the same between consecutive picture frames, and the difference between objects or blocks in successive frames is their position in the frame as a result of motion (either due to object motion, camera motion or both). The key to this relative encoding is motion estimation. In general, motion estimation is an essential processing requirement in most video compression algorithms. As described above, motion estimation is the task of identifying temporal redundancy between frames of the video sequence.

When an MPEG decoder receives an encoded stream, the MPEG decoder reverses the above operations. Thus the MPEG decoder performs inverse scanning to remove the zig zag ordering, inverse quantization to de-quantize the data, and the inverse DCT to convert the data from the frequency domain back to the pixel domain. The MPEG decoder also performs motion compensation using the transmitted motion vectors to re-create the temporally compressed frames.

Computation of the inverse discrete cosine transform (IDCT) generally requires a large amount of processing. One known method for computing the IDCT is referred to as the Chen algorithm. Prior art techniques for computing the Chen algorithm have used a Booth-Coded Multiplier with the coefficients stored in a ROM/RAM. However, this method has disadvantages, including inefficient use of die area due to the conventional implementation of multipliers and test complexity due to the usage of ROM/RAM for coefficient storage. In addition, this method does not take advantage of the inherent symmetry property of the coefficients in optimizing multipliers. Finally, this method provides generally low throughput.

Therefore, a new system and method is desired for efficiently computing the inverse discrete cosine transform (IDCT). A new system and method is desired for efficiently computing the inverse discrete cosine transform (IDCT) which utilizes the symmetry property of the coefficients in optimizing the multipliers.

SUMMARY OF THE INVENTION

The present invention comprises an MPEG decoder system and method for decoding frames of a video sequence. The MPEG decoder includes IDCT computation logic which computes the IDCT with improved performance. The IDCT logic performs the inverse DCT based on the Chen algorithm for IDCT computation. The system and method of the present invention efficiently utilizes properties of the coefficients in optimizing the matrix multiply functions, thus providing improved performance.

Chen's algorithm is commonly used to perform the two-dimensional IDCT. The Chen algorithm computes:

$$[f]=[I][F]$$

where F is the incoming un-quantized data which is in the DCT domain, i.e., is the data that is to be converted. The matrix [f] is the output or result of the IDCT computation. According to the Chen algorithm, the transform matrix I is defined as:

$$[I]=[Q]\times[P]$$

The Chen algorithm calculation can be written as:

$$f=(Q\times F^T\times Q\times P)^T\times P$$

The Q matrix is a diagonal matrix which has diagonal non-zero values, with the remainder of the values being 0. The P matrix includes a plurality of values which are the opposite sign of each other. The system and method of the present invention uses the diagonal nature of the Q matrix, the similarities or symmetry in matrix coefficients in the P matrix, as well as the nature and bit representation of the P matrix coefficients, to perform more efficient IDCT computations.

The output matrix resulting from the computation $(Q\times F^T)\times Q$ requires only 10 different discrete values or constants which are multiplied by the input coefficients $F_{uv}$. According to the present invention, these 10 constant values above are generated or provided in hardware depending upon the row/column position of the input coefficient $F_{xx}$. In other words, instead of performing a matrix multiplication to obtain the result, $(Q \times F^T) \times Q)$, the system and method of the present invention utilizes the fact that the resultant matrix only requires 10 discrete values or constants which are required to be multiplied by the input coefficients to obtain the resultant matrix. Thus, the calculation $(Q \times F^T) \times Q)$ is performed by multiplying the input coefficients by one of these constants.

In the preferred embodiment for generating the $(Q \times F^T) \times Q)$ matrix with reduced computational requirements according to the present invention, the input F value is provided to the input of a multiplier. The row/column information of the respective input F value is provided to the input of a state machine. The state machine examines the row/column information and generates the appropriate constant which is provided to another input of the multiplier. Thus, computation of the $(Q \times F^T) \times Q)$ matrix requires only a single multiplier.

According to the present invention, the system and method also takes advantage of the coefficient values in the P matrix to reduce the required number of multipliers. For the f output values, multiplication of the input F values times the respective P matrix constants includes multiplication by at least one "1" (or "−1") value for each Fx value. The system and method of the present invention takes advantage of this multiplication by 1 for each F term to reduce the required number of multipliers from four to three. The present invention also uses multiplexers to insure that the appropriate constant values are multiplied with the respective F value, and that the F value which is multiplied by 1 or −1 is passed through without any required multiplication. Thus, the present invention requires only three multipliers, as opposed to the use of four multipliers in prior art.

The present invention also optimizes each of the multipliers using knowledge of the bit representations of the P matrix. The P matrix only includes eight unique constants or values, excluding the difference in sign of the values. These unique constants are 1, a, b, c, r(a+1), r(a−1), r(c−1), and r(c+1). The bit representations of each of these constants includes at most six ones in a respective bit representation. According to the system and method of the present invention, multiplication of these values by incoming values is formed by adding six terms, which are shifted depending upon the bit presence. Thus, the present invention takes advantage of the fact that the multiplication being performed comprises multiplying an unknown variable, which is the received F value, with one of eight known values. Since the eight constant values which are the multiplicands are known, the present invention takes advantage of the fact that the bit representation of each of these values has at most six 1 values. Thus, the present invention performs shift/add functions using six terms or six adders, which depend on the bit presence. This reduces the required number of adders in each multiplier, thus saving die area and increasing performance.

Therefore, the present invention provides an improved system and method for computing the inverse discrete cosine transform.

BRIEF DESCRIPTION OF THE DRAWINGS

A better understanding of the present invention can be obtained when the following detailed description of the preferred embodiment is considered in conjunction with the following drawings, in which:

FIG. 5 illustrates the P matrix;

FIG. 6 illustrates the Q matrix;

FIG. 7 illustrates the Q matrix for the variables e, f, g and h representing the constants of FIG. 6;

FIG. 8 illustrates the $F^T$ which comprises the F input values transposed;

FIG. 9 illustrates the matrix result of $Q \times F^T$;

FIG. 10 illustrates the result of $Q \times F^T \times Q$;

FIG. 13 illustrates the P matrix and illustrates the symmetrical nature of the coefficient values comprising the P matrix;

FIG. 14 illustrates the first stage IDCT P matrix computations for one row;

FIG. 16 illustrates the P matrix constants and their corresponding bit representation;

FIGS. 19 and 20 further illustrate the optimized multiplier of FIG. 15 having a reduced number of adders according to the preferred embodiment of the invention.

DETAILED DESCRIPTION OF THE PREFERRED EMBODIMENT

Video Compression System

Figure 1:
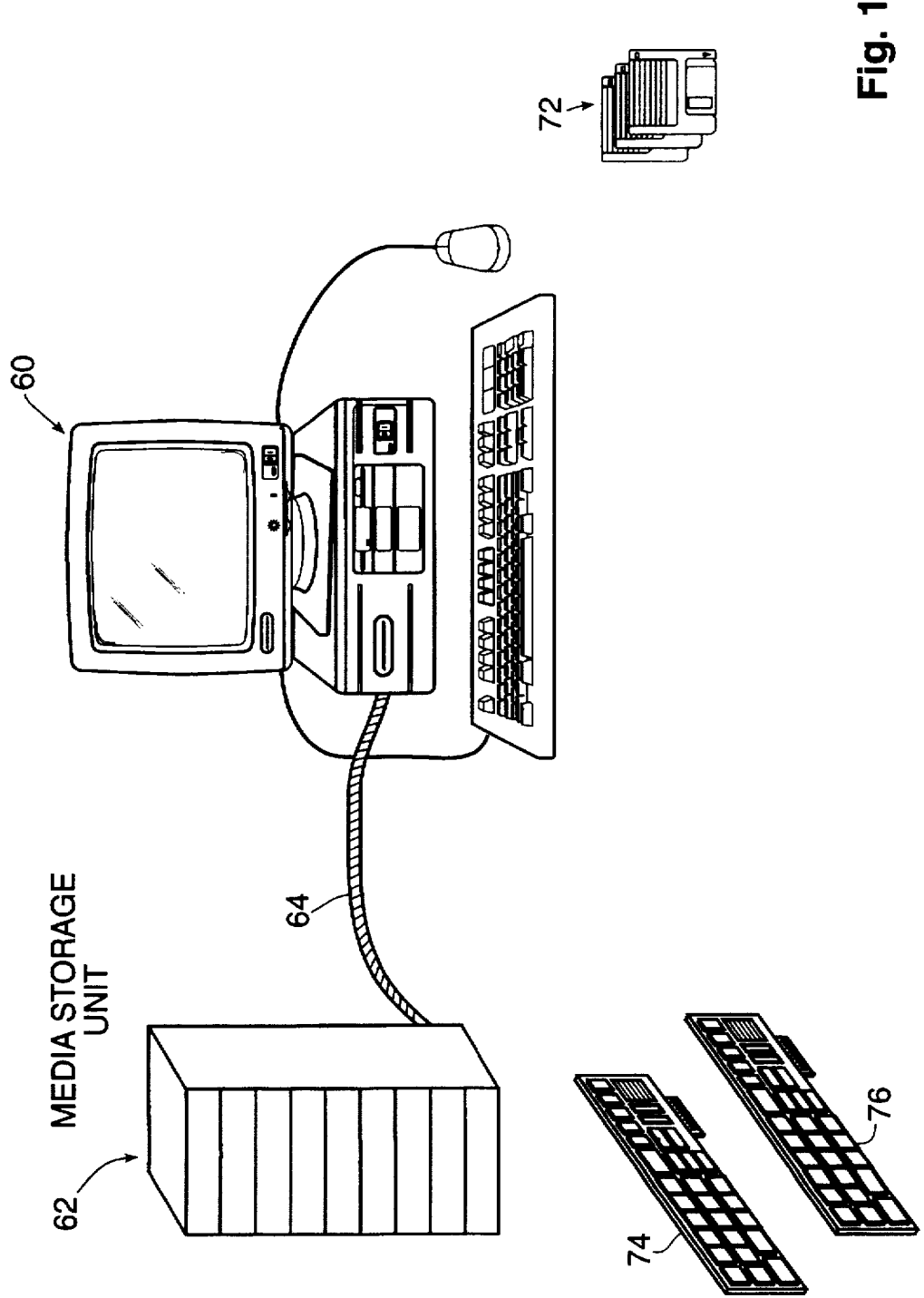
FIGS. 1 illustrates a computer system which performs video decoding and which includes a motion compensation logic having a frame memory which stores reference block data in a novel skewed tile arrangement according to the present invention.

Referring now to FIG. 1, a system for performing video compression and/or decompression operations according to the present invention is shown. The system of the present invention performs computation of the inverse discrete cosine transform (IDCT) during video encoding or video compression and/or video decoding or video decompression. However, the system of the present invention may be used to perform the IDCT for use in any of various types of applications, as desired.

As shown, in one embodiment the video encoding/decoding system comprises a general purpose computer system 60. The video encoding/decoding system may comprise any of various types of systems, including a computer system, set-top box, television, or other device. In various embodiments, one or both of the video encoding and video decoding operations include the improved IDCT computation system and method of the present invention.

The computer system 60 is preferably coupled to a media storage unit 62 which stores digital video files which are to be decompressed or decoded by the computer system 60. The media storage unit 62 may also store the resultant decoded or decompressed video file. In the preferred embodiment, the computer system 60 receives a compressed video file or bitstream and generates a normal uncompressed digital video file. In the present disclosure, the term "compressed video file" refers to a video file which has been compressed according to any of various video compression algorithms which use motion estimation techniques, including the MPEG standard, among others, and the term "uncompressed digital video file" refers to a stream of decoded or uncompressed video.

As shown, the computer system 60 preferably includes a video decoder 74 which performs video decoding or decompression operations. The video decoder 74 is preferably an MPEG decoder. The computer system 60 optionally may also include an MPEG encoder 76. The MPEG decoder 74 and MPEG encoder 76 are preferably adapter cards coupled to a bus in the computer system, but are shown external to the computer system 60 for illustrative purposes. The computer system 60 also includes software, represented by floppy disks 72, which may perform portions of the video decompression or decoding operation, or performs portions of the video compression or encoding operation, and/or may perform other operations, as desired.

Figure 2:
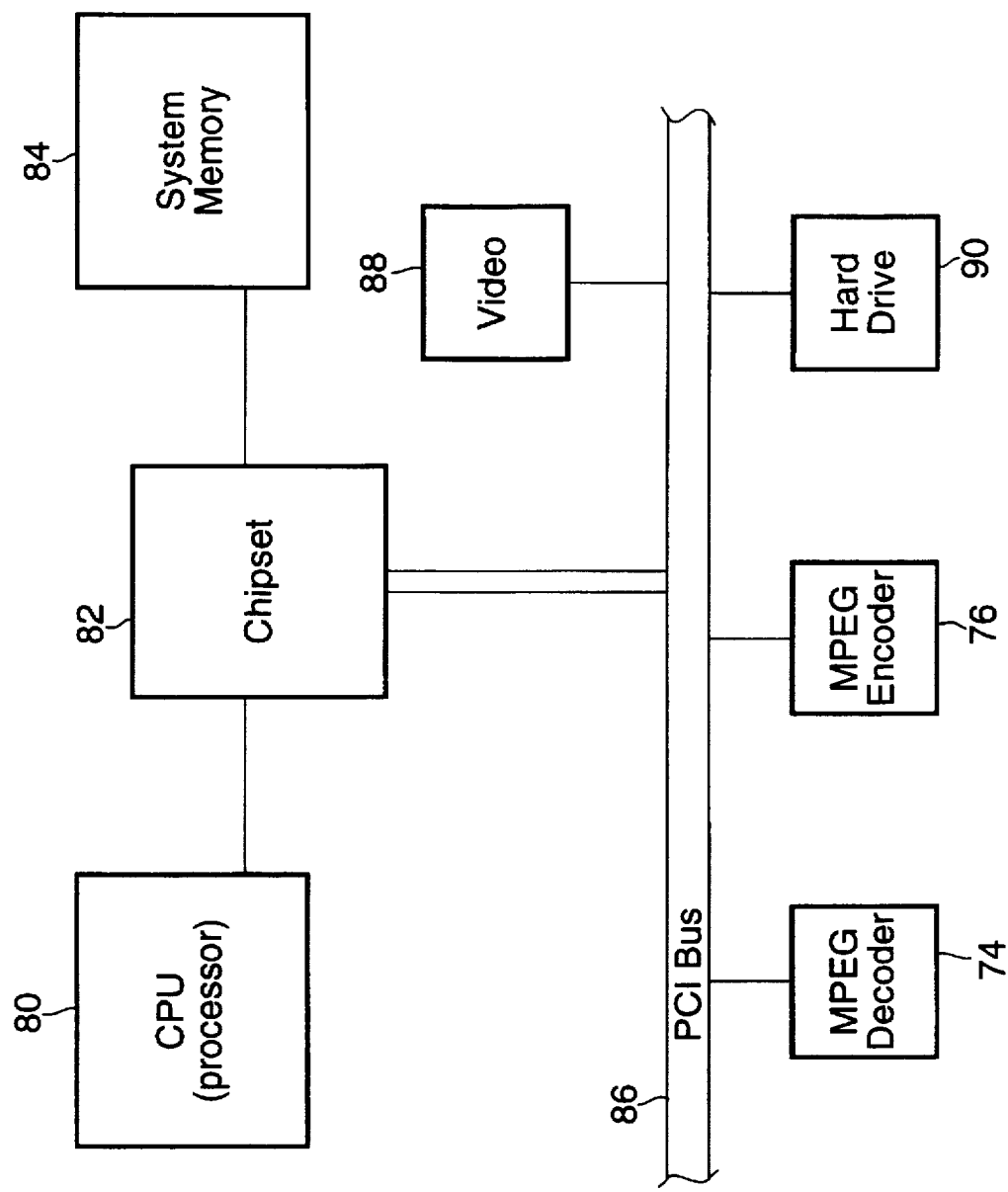
FIG. 2 is a block diagram illustrating the computer system of FIG. 1.

The computer system 60 preferably includes various standard components, including one or more processors, one or more buses, a hard drive and memory. Referring now to FIG. 2, a block diagram illustrating the components comprised in the computer system of FIG. 1 is shown. It is noted that FIG. 2 is illustrative only, and other computer architectures may be used, as desired. As shown, the computer system includes at least one processor 80 coupled through chipset logic 82 to a system memory 84. The chipset 82 preferably includes a PCI (Peripheral Component Interconnect) bridge for interfacing to PCI bus 86, or another type of bus bridge for interfacing to another type of expansion bus. In FIG. 2, MPEG decoder 74 and MPEG encoder 76 are shown connected to PCI bus 86. Various other components may be comprised in the computer system, such as video 88 and hard drive 90.

As mentioned above, in the preferred embodiment of FIG. 1 the computer system 60 includes or is coupled to one or more digital storage or media storage devices. For example, in the embodiment of FIG. 1, the computer system 60 couples to media storage unit 62 through cable 64. The media storage unit 62 preferably comprises a RAID (Redundent Array of Inexpensive Disks) disk array, or includes one or more CD-ROM drives and/or one or more Digital Video Disk (DVD) storage units, or other media, for storing digital video to be decompressed and/or for storing the resultant decoded video data. The computer system may also include one or more internal RAID arrays, CD-ROM drives and/or may couple to one or more separate Digital Video Disk (DVD) storage units. The computer system 60 also may connect to other types of digital or analog storage devices or media, as desired.

Alternatively, the compressed digital video file may be received from an external source, such as a remote storage device or remote computer system. In this embodiment, the computer system preferably includes an input device, such as an ATM (Asynchronous Transfer Mode) adapter card or an ISDN (Integrated Services Digital Network) terminal adapter, or other digital data receiver, for receiving the digital video file. The digital video file may also be stored or received in analog format and converted to digital data, either externally to the computer system 60 or within the computer system 60.

As mentioned above, the MPEG decoder 74 in the computer system 60 performs video decoding or video decompression functions. In performing video decoding or video decompression, the MPEG decoder 74 performs the inverse discrete cosine transform (IDCT) As discussed further below, the MPEG decoder 74 in the computer system 60 computes the IDCT with reduced hardware requirements and improved performance. The MPEG decoder 74 thus performs MPEG decoding with improved efficiency and reduced hardware requirements according to the present invention.

As also mentioned above, the MPEG encoder 76 in the computer system 60 performs video encoding or video compression functions. In performing video encoding or video compression, the MPEG encoder 76 performs the inverse discrete cosine transform (IDCT) on certain data As discussed further below, the MPEG encoder 76 in the computer system 60 computes the IDCT with reduced hardware requirements and improved performance. The MPEG encoder 76 thus performs MPEG encoding with improved efficiency and reduced hardware requirements according to the present invention.

It is noted that the system of FIG. 1 may comprise two or more interconnected computers, as desired. The system for encoding or decoding video data may also comprise other hardware, such as a set top box, either alone or used in conjunction with a general purpose programmable computer. It is noted that any of various types of systems may be used for encoding and/or decoding video data according to the present invention, as desired.

Figure 3:
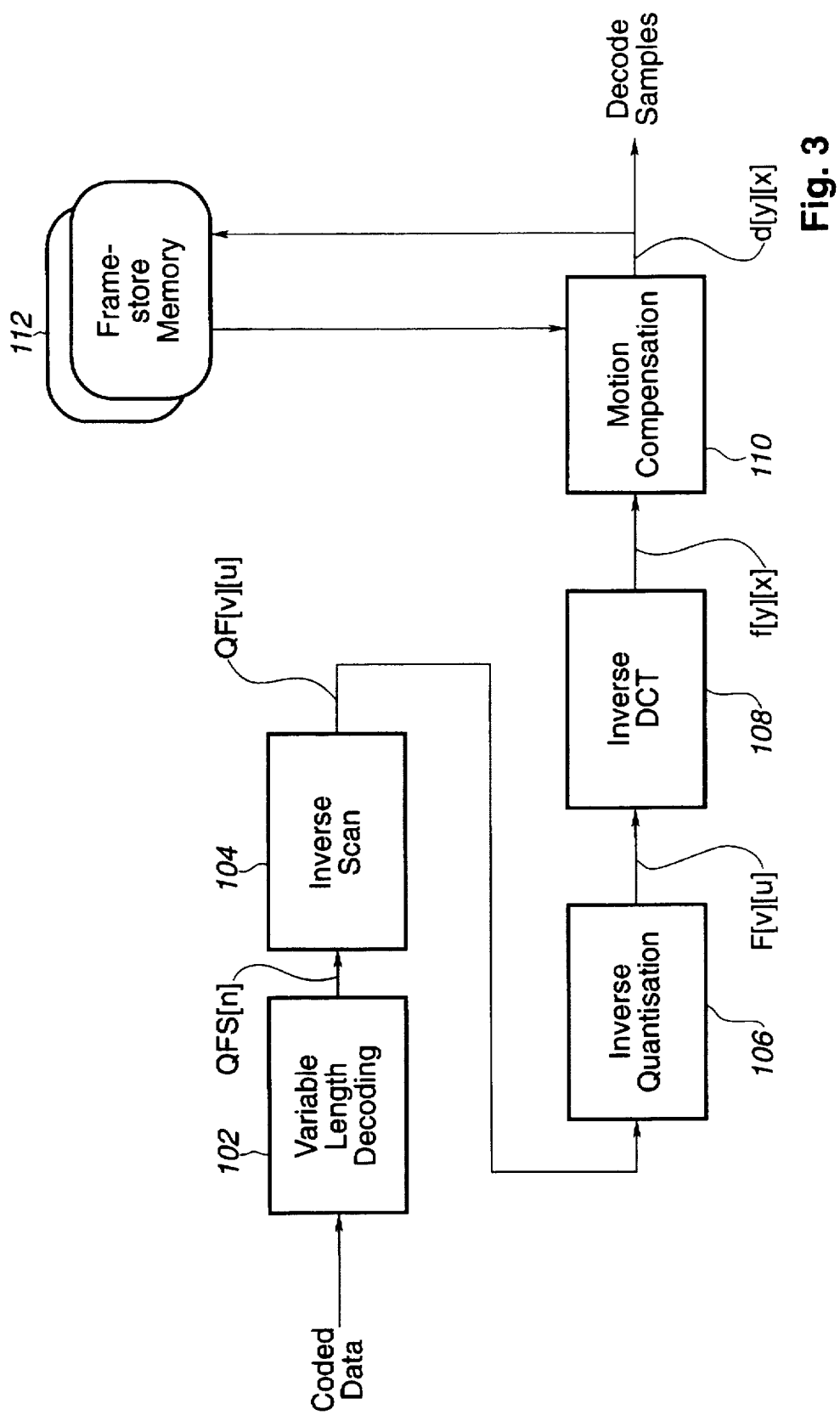
FIG. 3 is a block diagram illustrating an MPEG encoder according to the present invention.

FIG. 3—MPEG Decoder Block Diagram

Referring now to FIG. 3, a block diagram illustrating the MPEG decoder 74 which performs IDCT computations according to the present invention is shown. As shown, the video decoder 74 receives an encoded or compressed digital video stream and outputs an uncompressed digital video stream. The compressed digital video stream is a bitstream of compressed video data which is used to present a video sequence, such as a television segment or movie, onto a screen, such as a television or a computer system. In the preferred embodiment, the compressed digital video stream is compressed using the MPEG-2 compression algorithm, and the video decoder 74 is thus preferably an MPEG-2 decoder. Since the operation of MPEG decoders is well known in the art, details of their operation which are not necessary to the operation of the present invention are omitted for simplicity.

As shown in FIG. 3, the MPEG decoder 74 comprises a Variable Length Decoding block 102 coupled to provide an output to an Inverse Scan block 104, which is coupled to provide an output to an Inverse Quantization block 106, which is coupled to provide an output to an Inverse DCT block 108, which is coupled to provide an output to a motion compensation block 110. The motion compensation block 110 provides an output comprising decoded samples. A frame store memory 112 is coupled to the output of the motion compensation block 110 to receive and store decoded frame data. The motion compensation block 110 is coupled to an output of the frame store memory 112 to receive reference block data from the frame store memory 112 during motion compensation.

As shown in FIG. 3, the Variable Length Decoding block 102 receives coded data and performs variable length decoding. As is well known, the MPEG standard provides that data is compressed for transmission using variable length codes. Thus the Variable Length Decoding block 102 decodes this data and produces an output, referred to as QFS[n]. The QFS[n] output of the Variable Length Decoding block 102 is provided to the Inverse Scan block 104. The Inverse Scan block 104 reverses the zig zag scan ordering of the received data (is this right) and produces an output referred to as QF|v||u|. The output QF|v||u| is provided to the Inverse Quantization block 106. The Inverse Quantization block 106 performs inverse quantization or de-quantizes the data to produce de-quantized data, referred to as F|v||u|. The output F|v||u| of the Inverse Quantization block 106 is provided to the Inverse DCT block 108, which performs the inverse discrete cosine transform to convert the data from the frequency domain back to the pixel domain. As discussed further below, the IDCT block 108 performs the IDCT with improved efficiency and reduced hardware requirements according to the present invention. The inverse DCT block 108 produces an output referred to as f|y||x|. The output f|y||x| of the inverse DCT block 108 is provided to the motion compensation block 110.

The output f|y||x| from the inverse DCT block 108 comprises temporally encoded frames of pixel data. The motion compensation block 110 decompresses the temporally compressed frames using motion compensation techniques. Output pixel values from the motion compensation block 110 are provided to a frame store memory 112. The frame store memory 112 is thus coupled to the motion compensation block 110 and stores one or more reference frames of video data. These reference frames of video data are used by the motion compensation block 110 in performing motion compensation on temporally compressed frames, such as P and B frames.

Figure 4:
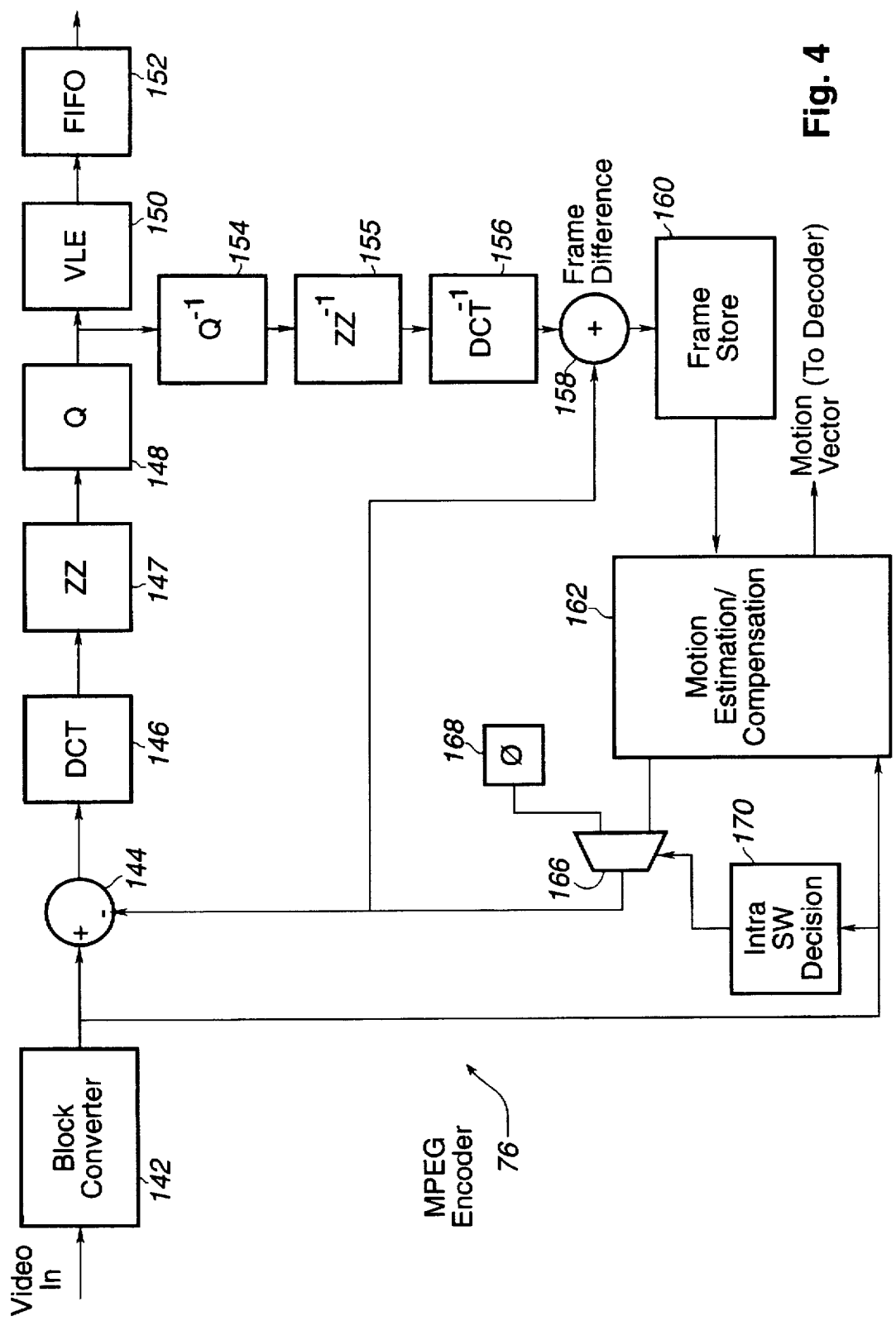
FIG. 4 is a block diagram illustrating an MPEG decoder according to the present invention.

FIG. 4—MPEG Encoder Block Diagram

Referring now to FIG. 4, a block diagram illustrating MPEG encoder 76 which performs the IDCT according to the present invention is shown. As shown, the video encoder 76 receives an uncompressed digital video stream and outputs an encoded stream. The uncompressed digital video stream is a bitstream of video data which is used to present a video sequence, such as a television segment or movie, onto a screen, such as a television or a computer system. In the preferred embodiment, the video encoder 76 compresses the uncompressed digital video stream using the MPEG-2 compression algorithm.

As shown in FIG. 4, a block converter 142 converts input luminance and chrominance video signals to block format, where each block preferably comprises an 8×8 matrix of 64 pixel values. The block format is preferably implemented as a plurality of macroblocks grouped into particular spacing formats depending upon the particular type of encoding system, such as the standard 4:4:4, 4:2:2, 4:2:0 etc. spacing formats, for example. The block converter 142 provides sequential pixel values to a subtractor 144 and to motion estimation/compensation logic 162, described further below. The block converter 102 also provides an output to an Intra-SW decision block 170.

The subtractor 144 receives an input from a multiplexer 166 and operates to subtract the output of the multiplexer 166 from the output of the block converter 142. The multiplexer 166 receives inputs from the motion estimation/ compensation logic 162 and also receives a 0 input from block 168. The multiplexer 166 receives a select input from the Intra-SW decision block 170. The Intra-SW decision block 170 determines whether an interfield or intrafield mode is being used. In the interfield data mode, the multiplexer 166 provides the output from the motion estimation/ compensation block 162, and the subtractor 142 subtracts each block of a macroblock provided by motion estimation/ compensation logic 162 from a corresponding block provided from the block converter 142. In the intrafield data mode, the multiplexer 166 provides an output from the zero block 168, and thus the blocks from the block converter 142 pass through the subtractor 144 unmodified.

The subtractor 144 provides output blocks of motion-predicted, differentially encoded macroblocks (intermode) or unmodified output blocks (intramode) to a DCT converter 146. The DCT converter 146 converts each of the blocks to DCT format, resulting in corresponding 8×8 blocks of DCT coefficients. The DCT format expresses the data in the frequency domain for enabling compression of video data. For each DCT block, the first or top left coefficient typically comprises the DC component of the block, and the remaining values are AC components for increasing vertical and horizontal frequencies.

The DCT coefficients from the DCT converter 146 are provided to a ZZ block 147 which re-orders the pixels in a zig zag format. The output of the ZZ block 147 is provided to a quantizer 148, which maps sets of coefficient values into a quantized value. Smaller sets are typically used for the lower-frequency coefficients, i.e., fine quantization, than for the higher-frequency coefficients, since the human eye is less sensitive to image components at higher spatial frequencies than to components at lower spatial frequencies.

The data values from the quantizer 148 are provided to a variable length encoder (VLE) 150 for encoding the data for purposes of storage and/or transmission. The VLE 150 scans and converts the blocks of data to variable length codes (VLCs) according to the principles of entropy coding, where shorter codes are allocated to the more probable values to achieve coding gain and thus compression of the data. One such VLC coding scheme is referred to as Huffinan coding, although other coding schemes are contemplated. The VLCs are provided from the VLE 150 to a first-in first-out (FIFO) buffer 152.

For the interfield mode, the data values from the quantizer 148 are provided to an inverse quantizer 154 for reversing the operation performed by the quantizer 148 to produce approximate DCT coefficients representing each block of the encoded image. Since quantization is usually a lossy process, the output of the inverse quantizer 154 introduces noise and errors.

The output data of the inverse quantizer 154 is provided to an inverse ZZ block 155 which reverses the operation of the ZZ block 147. The output of the inverse ZZ block 155 is provided to an inverse DCT (IDCT) converter 156 for reversing the operation performed by the DCT converter 146. As discussed further below, the IDCT converter 156 preferably performs IDCT computations according to the present invention. The frame difference blocks at the output of the IDCT converter 156 are provided to one input of a two-input adder 158. The adder 158 also receives the output data blocks from the motion compensation logic 162. The output pixel values from the adder 158 are provided to a frame store memory 160, where the stored data may be provided to a video buffer (not shown) and displayed on a display device (not shown), such as a monitor.

The values in the frame store memory 160 are provided to the input of the motion estimation/compensation logic 162. In general, the motion estimation/compensation logic 162 compares the incoming block from the block converter 142 with the reconstructed previous block stored in the frame store memory 160 to measure motion in the form of motion vectors. The motion estimation/compensation logic 162 of FIG. 4 performs motion estimation in the spatial domain using prior art techniques.

The motion estimation/compensation logic 162 shifts objects or blocks to estimated positions in the new frame, resulting in predicted blocks. In the interfield mode, this predicted block is then subtracted from the input block to obtain a block difference or prediction error. This process separates interframe redundancy and the prediction error. In the interfield mode, the block difference is then processed by the DCT converter 146, ZZ block 147, and the quantizer 148 to remove spatial redundancy. Thus, in this prior art method, motion estimation is performed in the spatial or pixel domain, and the frame difference is then DCT transformed and quantized.

Inverse DCT

As mentioned above, the computation of the inverse DCT according to the present invention may be performed in either MPEG decoder 74 or MPEG encoder 76. As discussed above, the inverse DCT comprises receiving un-quantized data, referred to as F|u||v| and performing the inverse discrete cosine transform to convert the data from the frequency domain back to the pixel domain. The inverse DCT produces an output referred to as f|y||x|.

As also mentioned above, Chen's algorithm is commonly used to perform the two-dimensional IDCT. According to the Chen algorithm, the transform matrix I is defined as:

$$|f|=|Q|\times|P|$$

F is the incoming un-quantized data which is in the DCT domain, i.e., is the data that is to be converted. The matrix |f| is the output or result of the IDCT computation.

The Chen algorithm calculation can be written as:

$$f=(Q\times F^T\times Q\times P)^T\times P$$

The P and Q matrices are illustrated in FIGS. 5 and 6, respectively. For the P matrix of FIG. 5, the variables are defined as follows:

$$a = \tan\left(\frac{7\pi}{16}\right) = 5.0273\sim=$$

101.00000110111111111011~= 101.00000111

$$b = \tan\left(\frac{6\pi}{16}\right) = 2.4142\sim=$$

010.01101010000010011110~= 010.01101010

$$c = \tan\left(\frac{5\pi}{16}\right) = 1.4966\sim=$$

001.01111111001000011001~= 001.01111111

$$r = \frac{1}{\sqrt{2}} = 0.7071\sim=$$

000.10110101000001001111~= 000.10110101

As shown in FIG. 6, the Q matrix is a diagonal matrix which has diagonal non-zero values, with the remainder of the values being 0. As shown in FIG. 5, the P matrix includes a plurality of values which are the opposite sign of each other. The system and method of the present invention uses the diagonal nature of the Q matrix, as well as the symmetry and properties of the matrix coefficients in the P matrix, to perform more efficient IDCT computations.

Use of the Diagonal Nature of the Q Matrix to Simplify Multiply Operations

Referring now to FIG. 7, if the values in the Q matrix (FIG. 6) are assigned with the variable names e, f, g and h, the Q matrix may be written as shown in FIG. 7. As shown in FIG. 7, the values of the Q matrix are rewritten as follows:

$$\frac{1}{\sqrt{2}} = e$$

$$\frac{1}{\sqrt{a^2+1}} = f$$

$$\frac{1}{\sqrt{b^2+1}} = g$$

$$\frac{1}{\sqrt{c^2+1}} = h$$

Assuming these values have the assigned variable names e, f, g and h, then the P matrix may be rewritten as shown in FIG. 7.

FIG. 8 illustrates the $F^T$ matrix, which is the F matrix that has been transposed. FIG. 9 illustrates the matrix multiplication of $Q\times F^T$. FIG. 10 illustrates the result of $(Q\times F^T)\times Q$. As shown in FIG. 10, the output matrix resulting from the computation $(Q\times F^T)\times Q$ requires only 10 different discrete values or constants which are multiplied by the input coefficients $F_{uv}$. In other words, from examination of the matrix shown in FIG. 10, it is clear that there are only 10 discrete values required to multiply the input coefficients $F_{uv}$ in order to obtain the resultant matrix $(Q\times F^T)\times Q$. These 10 values are ee
ef
eg
eh
ff
fg
fh
gg
gh
hh According to the present invention, these 10 constant values above are generated or provided in hardware depending upon the row/column position of the input coefficient $F_{xx}$. In other words, instead of performing a brute force multiplication to obtain the result, $(Q\times F^T)\times Q$, the system and method of the present invention utilizes the fact that the resultant matrix only requires 10 discrete values or constants which are required to be multiplied by the input coefficients to obtain the resultant matrix. Thus, the calculation $(Q\times F^T)\times Q$ is performed by multiplying the input coefficients by one of these constants.

Figure 11:
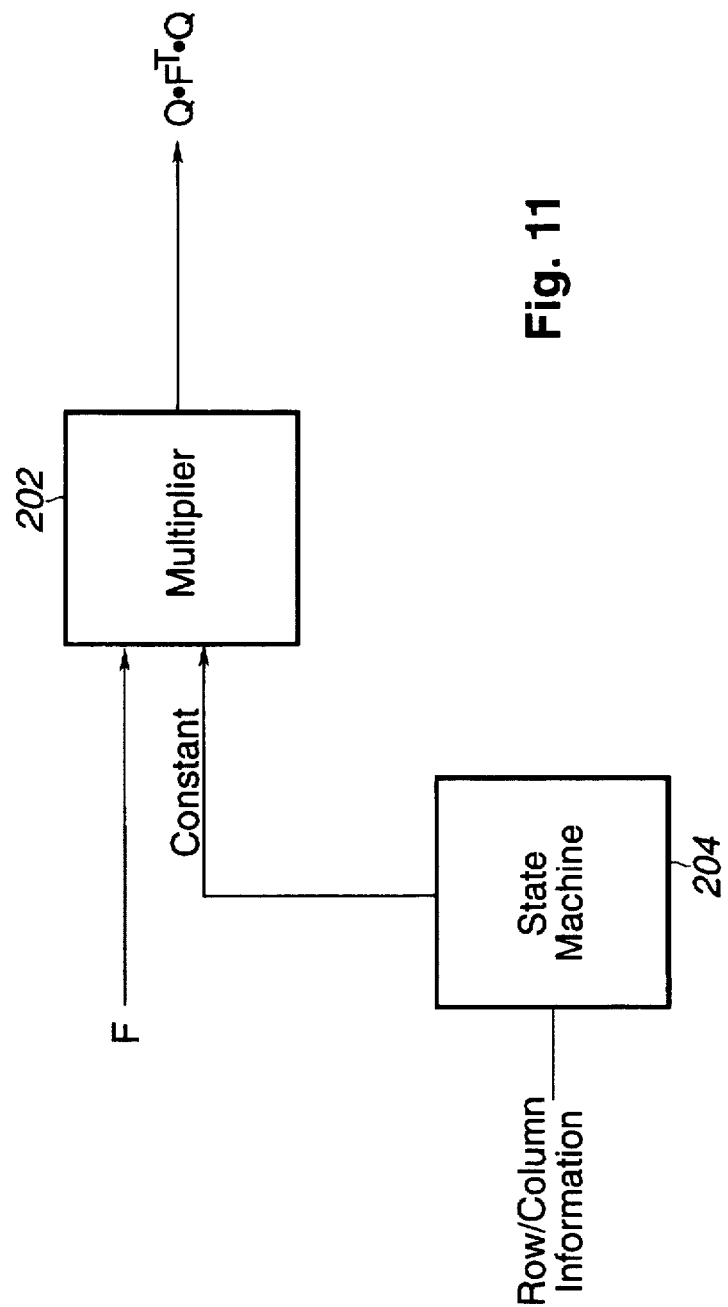
FIG. 11 illustrates a system for performing the computation $Q \times F^T \times Q$ utilizing a single multiplier according to the present invention.

FIG. 11 illustrates the preferred embodiment for generating the $(Q\times F^T)\times Q$ matrix with reduced computational requirements according to the present invention. As shown, the input F value is provided to the input of a multiplier 202. The row/column information of the respective input F value is provided to the input of a state machine 204. The logic 204 may be a state machine or look-up table or other logic. The state machine 204 examines the row/column information and generates the appropriate constant which is provided to another input of the multiplier 202.

Thus, if the F value being provided to the multiplier 202 is the value $F_{00}$, the row/column information provided to the state machine 204 is 00, and as a result the state machine 204 provides the constant ee to the multiplier 202. When the value $F_{01}$ is provided as an input to the multiplier 202, the row/column information provided to the state machine 204 directs the state machine 204 to provide the constant value ef to the multiplier 202. In a similar manner, the state machine 204 provides the appropriate constant value out of the 10 constant values to the multiplier 202 in response to the row/column information of the corresponding F value which is being provided to the multiplier 202. Thus, the matrix multiplication to obtain the result $(Q \times F^T) \times Q)$ is performed with a single multiplier 202 using the 10 constant values which are multiplied by the respective F terms. These 10 constant values are generated in hardware depending on the position of the input coefficient Fxx. Therefore, the computation of the matrix multiplication $(Q \times F^T) \times Q)$ is performed much more efficiently and with reduced hardware requirements.

Performing the P Matrix Multiplication

As discussed above, the two dimensional IDCT computation can be described as:

$$f = |Q \times F^T \times Q \times P|^T \times P.$$

As discussed above, the computation of the matrix multiplication $Q \times F^T \times Q$ can be performed with a single multiplier using a plurality of constants. This output $Q \times F^T \times Q$ can be represented by the variable Z. Thus, once this computation has been performed, the remaining computation required to perform the inverse discrete cosine transform is as follows:

$$F = |Z \times P|^T \times P$$

From this equation, it is shown that the value Z computed above is required to be multiplied with the matrix P, and the result $Z \times P$ must be transposed to compute $(Z \times p)^T$. This result then must be again multiplied by the matrix P. According to the present invention, the multiplications required to perform these computations are optimized using the similarities or symmetries within the P matrix, the nature of the coefficient values, and the bit patterns or representations of the coefficients in the P matrix.

Referring now to FIG. 12, a diagram is shown illustrating the matrix multiplications performed according to the preferred embodiment of the invention. FIG. 12 illustrates multiplication of the top row of an F matrix (FIG. 12a) times the first column of a P matrix (FIG. 12b). As shown, this multiplication results in the generation of values for the first column of the F×P matrix (FIG. 12c). According to the preferred embodiment of the invention, due to the symmetrical nature of the P matrix, this multiplication of the first row of the F matrix times the first column of the P matrix also results in generating values for the last column of the F×P matrix as shown. Thus, the present invention uses the symmetrical nature of the P matrix values to reduce the number of multiplications required. In other words, each multiplication of a row of the F matrix by a column of the P matrix produces two resulting columns of the F×P matrix. In the matrix F×P, similar shaded columns are generated through addition and subtraction on the same set of products.

Figure 12A:
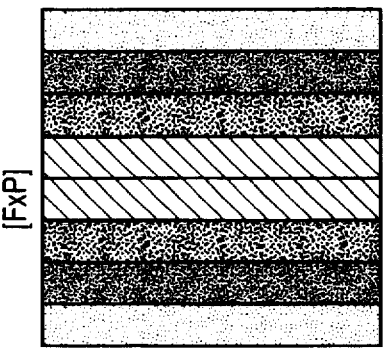
FIG. 12 illustrates matrix multiplication in the IDTC domain using the symmetrical properties of the P matrix.
Figure 12B:
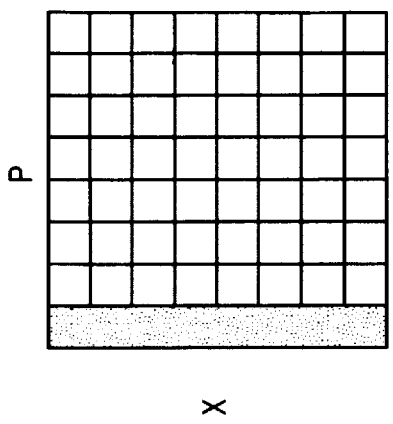
Figure 12C:
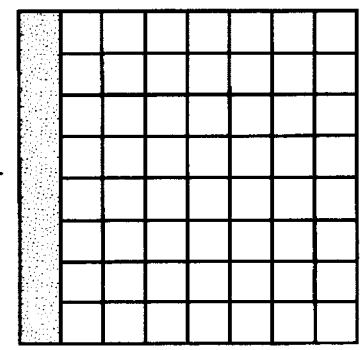
Figure 12D:
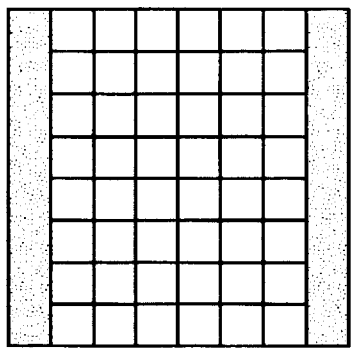
Figure 12E:
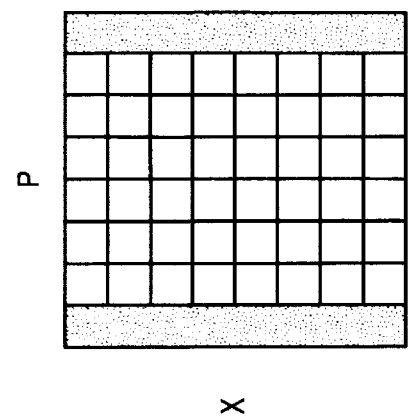
Figure 12F:
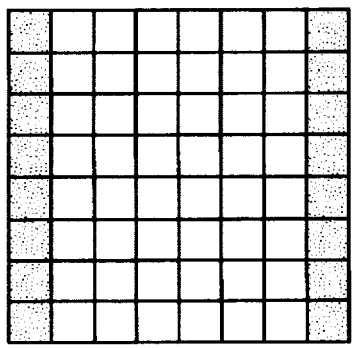

As shown in FIG. 12d, the F×P matrix is transposed, and this matrix is again multiplied by the P matrix to produce the corresponding matrix output or IDCT output. In this multiplication, the symmetrical nature of the P matrix is again used to reduce the required computations.

FIG. 13 illustrates the P matrix of FIG. 5 and also shows the symmetrical nature of the coefficients comprising the P matrix. As shown, the P matrix is substantially symmetrical about it's middle columns. The present invention uses this symmetrical nature as discussed further below.

FIG. 14 illustrates the first stage IDCT computations for one row of coefficients. As shown, the first column of multiplications comprises F0×1 and thus involves multiplying the F0 value times 1 for each of the f00–f07 terms. Each of the remaining columns of computations for the f00–f07 terms are symmetrical in nature. In other words, the multiplications for f00–f03 are substantially the same as the multiplications for f07–f04, except for a possible change in sign. Thus, as shown in column two of FIG. 14, for the output values f00–f03, the terms in the second column are F1×a, F1×r(a+1), F1×r(a–1) and 1. In a similar manner the output values f07–f04 include multiplication by –a, –r(a+1), –r(a–1) and –1. Thus, these multiplications are symmetrical, except for a change in sign. The preferred embodiment of the invention uses this symmetry to only compute the first four terms for each of F0–F7.

Using the Nature of the P Coefficients to Reduce the Required Number of Multipliers According to the present invention, the system and method takes advantage of the coefficient values in the P matrix to reduce the required number of multipliers. For the output values f00–f03 (or the output values f04–f07), multiplication of the values F0–F7 times the respective P matrix constants includes multiplication by at least one "1" (or "–1") value for each Fx value. Thus, for the F1 term, the F1 term is multiplied by a 1 for the f03 term. In a similar manner, the F2 term is multiplied by both 1 and –1 for the f01 and f02 terms. In a similar manner, each of F0–F7 are multiplied by at least one "1" value. In the present disclosure, the term unity is intended to mean either a "1" or "–1" value.

The system and method of the present invention takes advantage of this multiplication by 1 for each F term to reduce the required number of multipliers from four to three. The present invention also uses multiplexers to insure that the appropriate constant values are multiplied with the respective F value, and that the F value which is multiplied by 1 or –1 is passed through without any required multiplication. Thus, the present invention requires only three multipliers, as opposed to the use of four multipliers in prior art.

Figure 15:
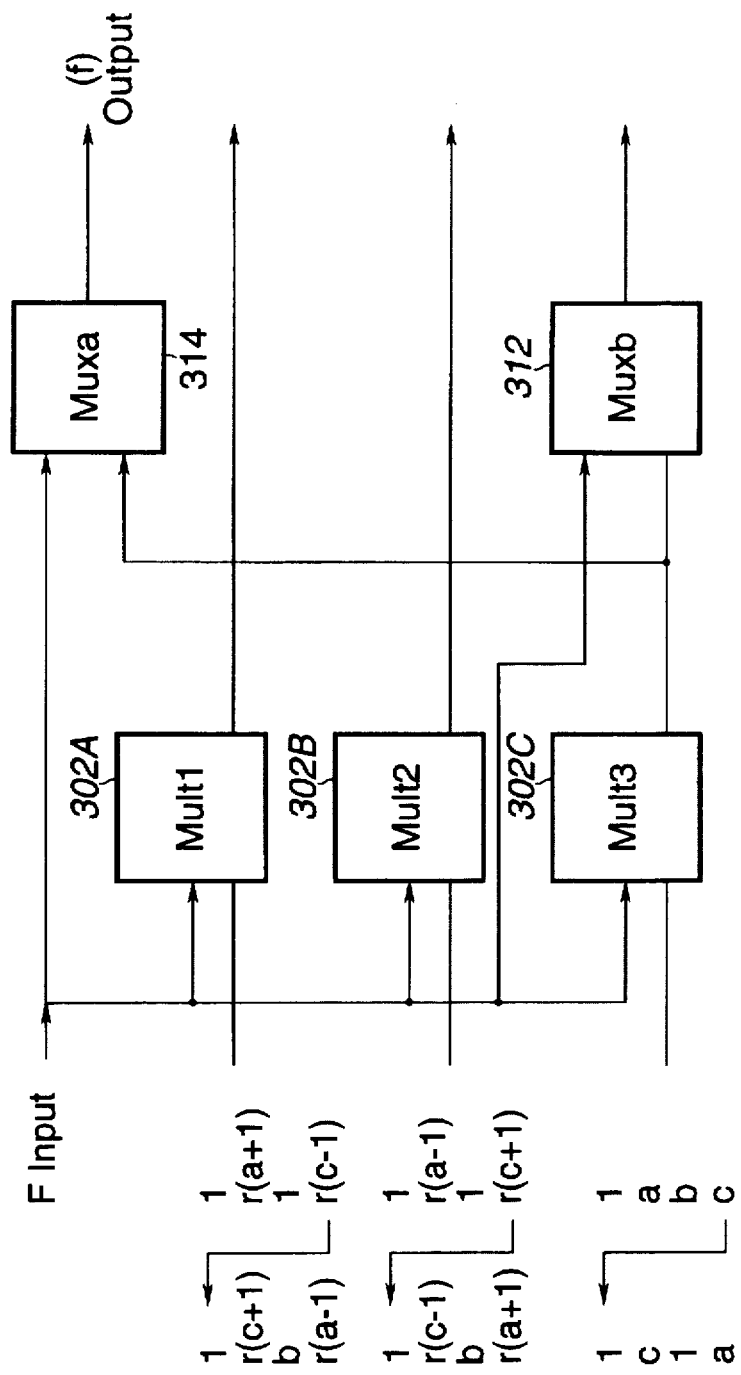
FIG. 15 illustrates a system for multiplying input values times the P matrix using a reduced number of multipliers according to the present invention.

Referring now to FIG. 15, a block diagram illustrating a portion of the IDCT computation logic according to the present invention is shown. As shown, this portion of the IDCT logic receives the F input which is provided to each of three multipliers 302a, 302b and 302c. Each of the multipliers 302a, 302b and 302c also receives a respective constant value, wherein the constant value received by each multiplier 302 depends on the position of the respective F value being received at the input. As shown, the multipliers 302a and 302b provide their outputs as shown. The multiplier 302c provides it's output to an input of a multiplexer 312. The F input is also provided as an input to the multiplexer 312. The multiplier 302c also provides its output to a second multiplexer 314. The other input of the multiplexer 314 receives the F input. The multiplexers 312 and 314 each provide an output as shown. The outputs of the two multiplexers 312 and 314, as well as the outputs from the two multipliers 302a and 302b, comprise the terms for each of the output values f00–f03. As discussed above, the values for f14–f07 can be generated from the values of f00–f13 due to the symmetrical nature of the coefficient values.

As mentioned above, at least one of each of the F1–F7 values are multiplied by a 1 value for each of the output values f00–f13. The matrix multiplication logic shown in FIG. 15 takes advantage of this property to reduce the required number of multipliers from four to three. The constant values provided as inputs to each of the multipliers 302a–302c correspond to computation of the matrix value terms shown in FIG. 14. The first multiplier 302a performs multiplications corresponding to the term f01 as shown in FIG. 14. The second multiplier 302b performs multiplications corresponding to the term f02 as shown in FIG. 14. The third multiplier 302c may correspond to either the f00 or f03 term depending upon which term requires multiplication by a constant which is not 1. Thus, the multiplier 302c corresponds to the f00 term for the constant values corresponding to F0, F1, F2, F3, F4 and F6. However, this multiplier receives constants corresponding to the f03 term for the terms F5 and F7.

The output of the third multiplier of 302c is provided to each of the two multiplexers 312 and 314 due to the fact that the multiplier 302c may be generating either the f00 term which is output from multiplexer 314, or the f03 term which is output from multiplexer 312. As shown, for the terms F0, F1, F2, F3, F4 and F6, the value received by the multiplier 302c comprises the f00 term as provided to the multiplexer 314 to enable the value to be output for the f00 term. For the values F0 and F1, the f03 value is multiplied by 1 and thus the input value is propagated to the multiplexer 312 as the output for the F0 and F1 values. For the F2 value, the F2 value is multiplied by −b for the f03 term, whereas F2 is multiplied by b for the f00 term. Thus, in this instance, the multiplier 302c multiplies the received F value times b and provides this output to both of the multiplexers 312 and 314 for output of the f00 and f03 terms. For the F3 and F4 terms, the multiplier 302c multiplies the F3 term by c and the F4 term by 1 and provides the output to the multiplexer 314 to provide this output for the f00 term. As shown, for the values F3 and F4, for the f03 term the F3 and F4 values are multiplied by 1 and thus in this instance the F input is provided to the multiplexer 312 as the F3 output and no multiplication is required. For the F5 input, the F5 input value is multiplied by c by the multiplier 302c, and this values is provided to the multiplexer 312 for output. In this instance, the input F5 is provided through the multiplexer 314 as an output since the F5 value is multiplied by 1 for the f00 term. For the F6 input term, for each of the f00 and f03 terms, the F6 value is multiplied by 1 and thus either the input is directly passed through each of the multiplexers 314 and 312 to output the F6 value unchanged, or the 1 value is multiplied by the multiplier 302c and this output is provided to each of the multiplexers 314 and 312 for output. In either of these cases, the identical output of F6 is provided for the f00 and f03 terms. For the F7 term, the multiplier 302c multiplies the input F7 term by a and provides this output only to the multiplexer 312 for output. For the f00 term, the F7 input value is multiplied by 1 and thus in this instance the input is provided directly through the multiplexer 314 as the output.

Therefore, the present invention utilizes the inherent nature of the P matrix values to reduce the required number of multipliers from four to three as shown in FIG. 15. Since the input F value is multiplied by at least one 1 value during this IDCT matrix computation, the present invention efficiently uses three multipliers to effectively perform the operation of four multipliers. This provides reduced hardware requirements and more efficient computation of the IDCT.

Optimized Multiplier Construction

Referring again to FIG. 5, the P matrix only includes eight unique constants or values, excluding the difference in sign of the values. These unique constants are 1, a, b, c, r(a+1), r(a−1), r(c−1), and r(c+1). FIG. 16 illustrates the P matrix constants and their bit representation according to an 11-bit format. As shown, the bit representations of each of these constants includes at most six ones in a respective bit representation. For example, as shown, the constant or coefficient value r(a−1) includes six "1" or unity values in the 11-bit representation. Each of the other constant values comprises six or less "1" values in their bit representation. According to the system and method of the present invention, multiplication of these values by incoming values is formed by adding six terms, which are shifted depending upon the bit presence. Thus, the present invention takes advantage of the fact that the multiplication being performed comprises multiplying an unknown variable, which is the received F value, with one of eight known values, since the eight constant values which are the multiplicands are known, the present invention takes advantage of the fact that the bit representation of each of these values has at most six 1 values. Thus, the present invention performs shift/add functions using six terms, which depend on the bit presence.

As shown in FIG. 16, the following groups can be constructed to form the minimum number of discrete terms that are required to be added. These groups are shown in FIG. 16b.

Figure 17:
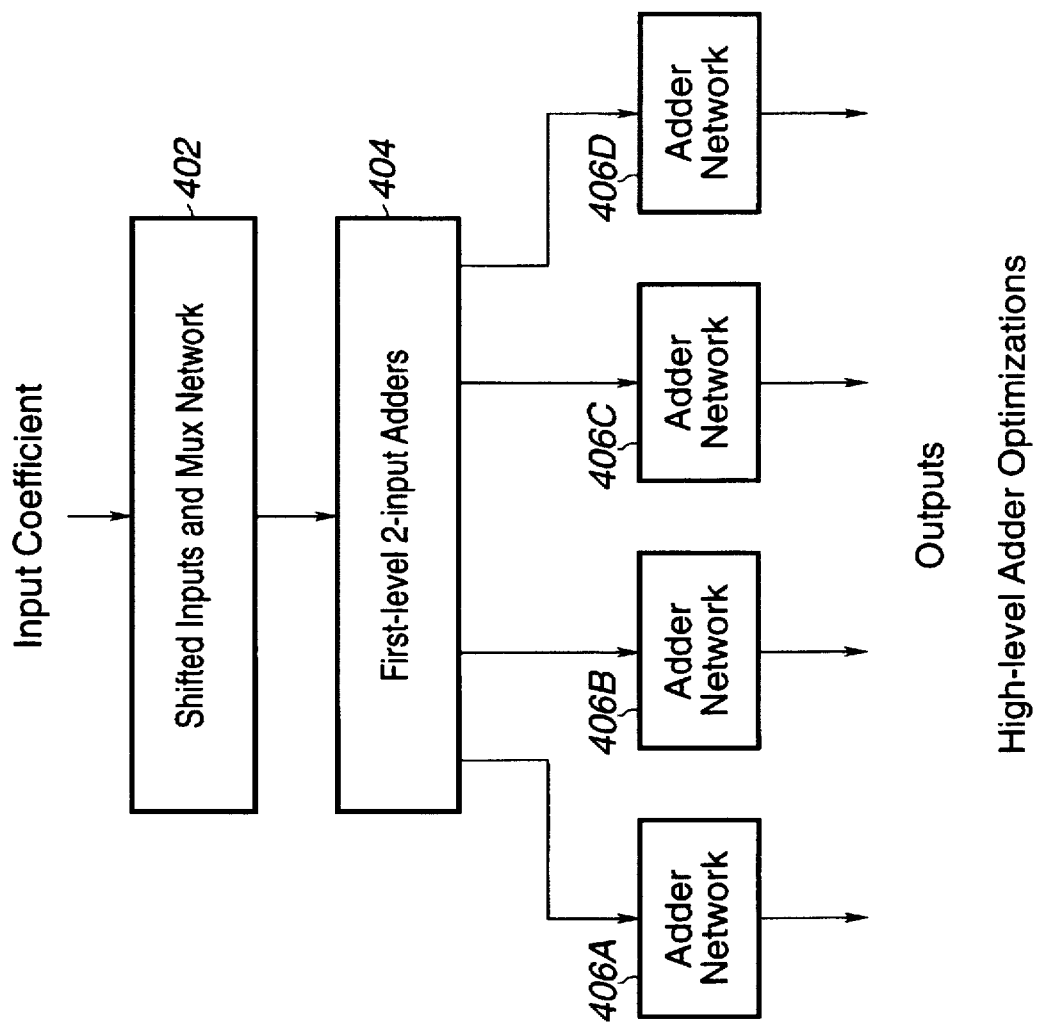
FIG. 17 illustrates the high level optimizations of each of the multipliers of FIG. 15 according to the present invention.
Figure 18:
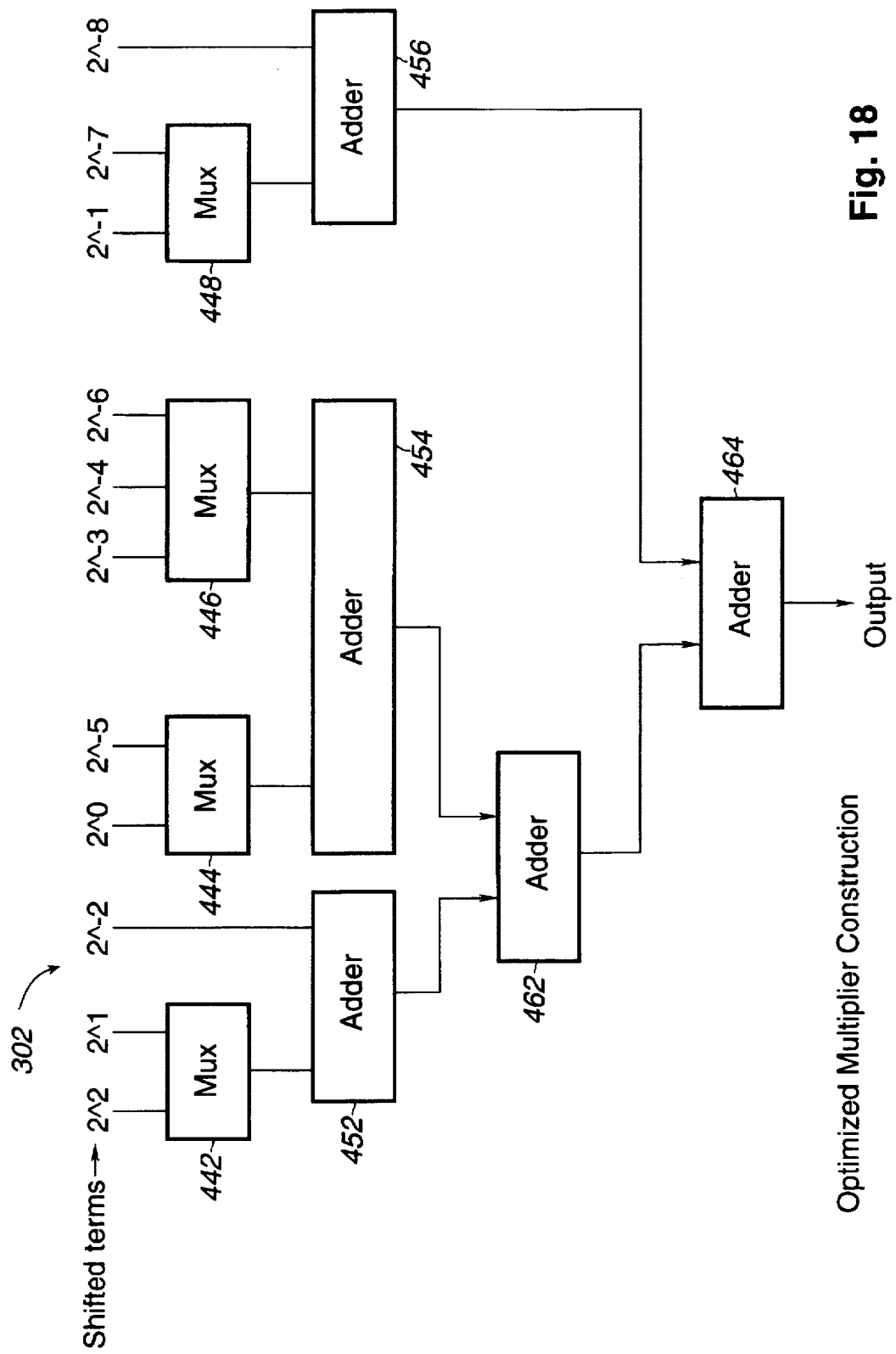
FIG. 18 illustrates a multiplier of FIG. 15 having a reduced number of adders according to the preferred embodiment of the invention.

FIG. 17 illustrates the high level optimization which is performed by the multiplier logic according to the present invention, and FIG. 18 illustrates the adder configuration which implements each of the multipliers 302. As shown, since the same input partial sums are required for different end results, these input partial sums can be used from the output instead of first level adders. FIG. 18 illustrates the adder configuration which performs these multiplications.

As shown in FIG. 17, the input coefficient is provided to a shifted input and mux network 402. The output of the shifted input and mux network 402 is provided to first level two input adders 404, as shown. The first level two input adders 404 provide respective outputs to a plurality of adder networks 406a, 406b, 406c, and 406d. Each of the adder networks 406a–406d provides respective outputs as shown.

Referring now to FIG. 18, a diagram illustrating one of the multipliers 302 of FIG. 15 is shown. As shown, the multiplier 302 includes a first multiplexer 442 which receives the shifted terms $2^2$ and $2^1$. The multiplexer 442 provides the first input to an adder 452. The adder 452 receives a second input which is the $2^{-2}$ shifted term. Each multiplier includes a second multiplexer 444 which receives the $2^0$ shifted term and the $2^{-5}$ shifted term. Each multiplier 302 further includes a third multiplexer 446 which receives the $2^{-3}$, $2^{-4}$ and $2^{-6}$ shifted F terms. Finally, each multiplier 302 includes a fourth multiplexer 448 which receives the $2^{-1}$ and $2^{-7}$ shifted F term. The output of the multiplexer 444 is provided to a first input of an adder 454. The output of the multiplexer 446 is provided to the second input of the adder 454. The output of the multiplexer 448 is provided to a first input of an adder 456. The shifted term $2^8$ is provided to the second input of the adder 456. The outputs of the adders 452 and 454 are provided to inputs of an adder 462. The output of the adder 462 and the output of the adder 456 are provided as inputs to a two input adder 464. The adder 464 provides the respective output.

Figure 20:
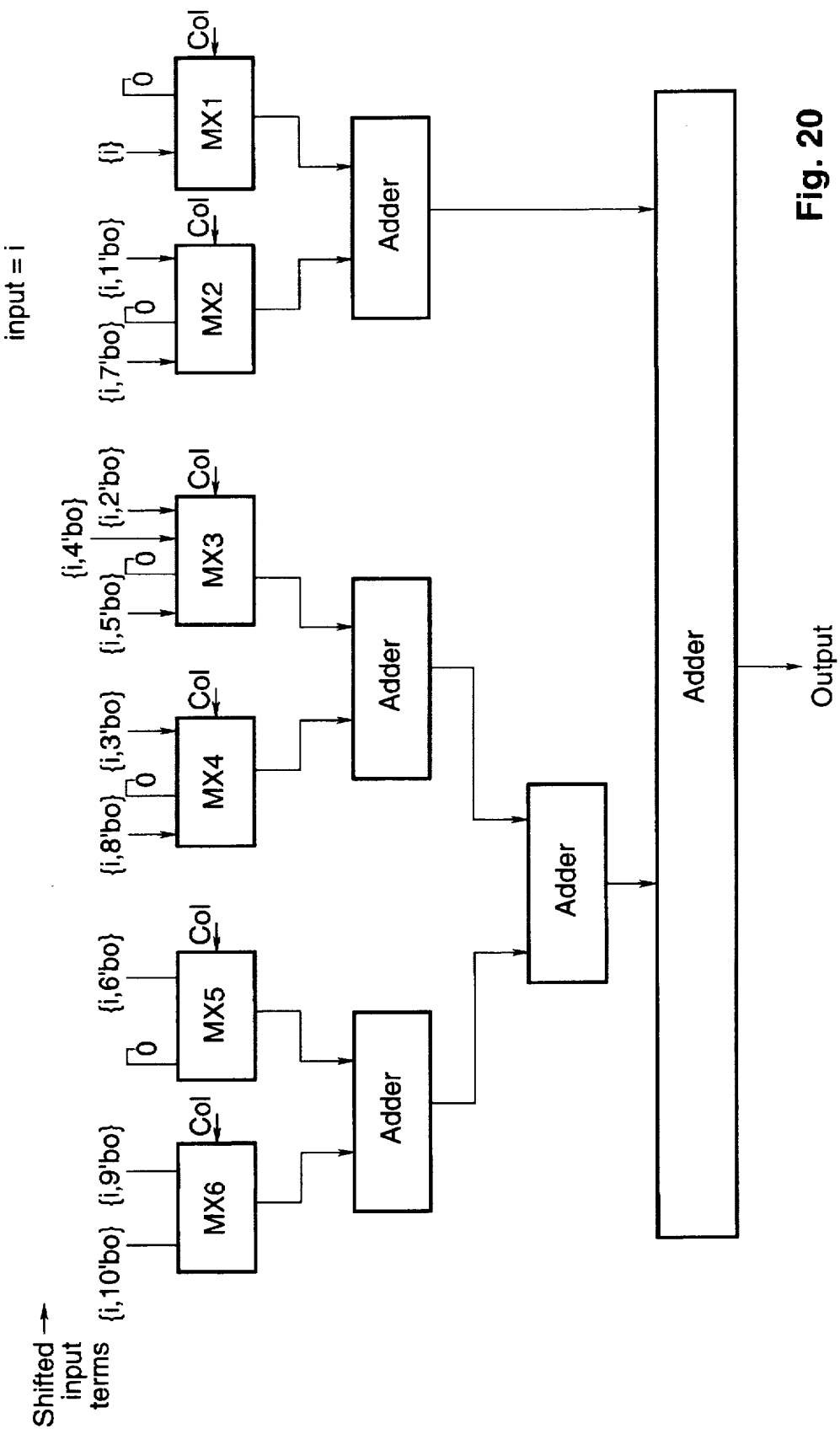

FIGS. 19 and 20 further illustrate the optimized multiplier of FIG. 15 having a reduced number of adders according to the preferred embodiment of the invention.

Therefore, the multiplier 302 includes only six adders for multiplying the 11-bit F input value with the respective constants in the P matrix. Since the constants in the P matrix are known, and the maximum number of one or unit values in the bit representation of any constant is six, the multipliers 302 is optimized to include only a sufficient number of adders which corresponds to the maximum number of possible one values in the bit representations of the constants in the P matrix. Thus, each multiplier 302 is optimized to include only five adders.

In contrast, prior art multipliers require 11 adders to perform an 11-bit multiplication. Further, as discussed above, the matrix multiplication logic shown in FIG. 15 requires only three multipliers, as opposed to the four multipliers required in the prior art. Thus, the present invention requires 3×6=15 adders, whereas prior art systems require 4×11=44 adders. Thus, the present invention requires a significantly lesser number of adders, thus resulting in a smaller die area. The present invention also provides more efficient and faster operation since the number of levels of logic is reduced. Further, the system and method of the present invention does not require storage of intermediate results since the input is consumed in all required coefficient multiplications. The system and method of the present invention also utilizes simple adders instead of complex macrocells in the data path. Finally, the system and method of the present invention does not use any type of ROM or RAM or other memory storage to store coefficients, and does not require generation of coefficients through hardware. Thus, the system and method of the present invention provides numerous advantages over the prior art.

Although the system and method of the present invention has been described in connection with the described embodiments, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A system for peforming the inverse discrete cosine transform on one or more received input DCT values, comprising:

a first multiplier having a first input for receiving the one or more input DCT values, wherein the first multiplier includes a second input;

logic for receiving row/column information corresponding to the received input DCT value received by the first multiplier, wherein the logic provides one of a plurality of constants in response to the row/column information, wherein the logic provides one of the plurality of constants to the first multiplier;

wherein the first multiplier multiplies the received input DCT value with the constant generated by the logic in response to the row/column information, wherein the first multiplier operates to multiply the received input DCT value with the received constant to produce an output value;

one or more second multipliers which receive output values from the first is multiplier for multiplying the received output values by one or more matrices to perform the inverse discrete transform on the received one or more DCT values.

2. The system of claim 1, wherein the one or more input DCT values comprise F values;

wherein the first multiplier outputs a plurality of values comprising the output matrix:
$(Q \times F^T) \times Q$.

wherein the Q matrix is the Q diagonal matrix according to the Chen IDCT algorithm;

wherein F comprises a matrix of the received input values.

3. The system of claim 2, wherein said one or more second multipliers multiplies the output matrix by a P matrix one or more times to obtain the inverse discrete cosine transform output.

4. The system of claim 3, wherein said one or more second multipliers performs the computation $((Q \times F^T) \times Q \times P)^T \times P$.

5. The system of claim 2, wherein the state machine logic receives row/column information and outputs one of 10 constant values, the one constant value comprising the element of matrix $Q \times U \times Q$ whose location is defined by the row/column information, wherein the matrix U is a square matrix all of whose entries are equal to one.

6. A method for performing the inverse discrete cosine transform on one or more received input DCT values, comprising:

receiving an input discrete cosine transform (DCT) value from a block of data;

receiving row/column position information of the received DCT input value, wherein the row/column position information indicates the row and column position of the received input DCT value within the data block;

generating a constant value in response to the received row/column information;

multiplying the received input DCT value with the constant generated in response to the row/column information to produce an output value performing one or more computations on the multiplication output value to complete the inverse discrete cosine transform on the received input DCT value.

7. The method of claim 6, wherein said receiving an input discrete cosine transform (DCT) value, receiving row/column position information, generating a constant value, and multiplying are performed a plurality of times to produce the output matrix $(Q \times F^T) \times Q$;

wherein the received input DCT value comprises an F value and wherein F comprises a matrix of the received input values; and wherein the Q matrix is the diagonal Q matrix according to the Chen IDCT algorithm.

8. The method of claim 7, wherein said generating a constant value in response to said row/column information comprises generating one of ten constant values comprised in the matrix $Q \times U \times Q$, wherein U is a square matrix all of whose entries are one.

9. The method of claim 8, wherein said performing one or more computations on the multiplication output value comprises performing one or more computations on the output matrix with the Chen IDCT P matrix one or more times to obtain an inverse discrete cosine transform output of the received input DCT values.

10. An MPEG decoder for decoding MPEG compressed data comprising:

a variable length decoder for performing variable length decoding on received MPEG encoded data;

inverse scan logic coupled to an output of the variable length decoder logic for performing inverse scanning on the data output from the variable length decoder;

inverse quantization logic coupled to an output of the inverse scan logic for performing inverse quantization on data output from the inverse scan logic to produce de-quantized DCT F values;

inverse discrete cosine transform logic coupled to an output of the inverse quantization logic for performing the inverse discrete cosine transform on the de-quanitized DCT F values; and motion compensation logic coupled to an output of the inverse discrete cosine transform logic for performing motion compensation on the pixel values output from the inverse discreet transform logic, wherein the motion compensation logic outputs decoded pixel data;

wherein the inverse discrete cosine transform logic comprises:

a first multiplier having a first input for receiving the one or more input DCT F values, wherein the first multiplier includes a second input;

logic for receiving row/column information corresponding to the received input DCT F value received by the first multiplier, wherein the logic provides one of a plurality of constants in response to the row/column information, wherein the logic provides one of the plurality of constants to the first multiplier;

wherein the first multiplier multiplies the received input DCT F value with the constant generated by the logic in response to the row/column information, wherein the first multiplier operates to multiply the received input DCT F value with the received constant to produce an output value;

wherein the first multiplier outputs a plurality of values comprising the output matrix:

$(Q \times F^T) \times Q$, wherein the Q matrix is the Q diagonal matrix according to the Chen IDCT algorithm and wherein F comprises a matrix of the received input values; and one or more second multipliers which receive output values from the first multiplier for multiplying the received output values by one or more P matrices to complete the inverse discrete transform on the received one or more DCT F values.

11. An MPEG encoder for performing MPEG encoding on pixel data, the MPEG encoder comprising:

discrete cosine transform (DCT) logic for performing the discrete cosine transform on received data values;

quantization logic coupled to the DCT logic for quanitizing the DCT values;

variable length encoding logic for performing variable length encoding on the quantized values;

inverse quantization logic coupled to the output of the quantization logic for dequantitizing the quantized values output from the quantization logic;

inverse discrete cosine transform logic coupled to the output of the inverse quantization logic for performing the inverse discrete cosine transform on the dequantized values output from the inverse quantization logic; and motion estimation/compensation logic for performing motion estimation and motion compensation functions for temporally encoding frame data, wherein the inverse discrete cosine transform logic comprises:

a first multiplier having a first input for receiving the one or more input DCT F values, wherein the first multiplier includes a second input;

logic for receiving row/column information corresponding to the received input DCT F value received by the first multiplier, wherein the logic provides one of a plurality of constants in response to the row/column information, wherein the logic provides one of the plurality of constants to the first multiplier;

wherein the first multiplier multiplies the received input DCT F value with the constant generated by the logic in response to the row/column information, wherein the first multiplier operates to multiply the received input DCT F value with the received constant to produce an output value;

wherein the first multiplier outputs a plurality of values comprising the output matrix:

$(Q \times F^T) \times Q$, wherein the Q matrix is the Q diagonal matrix according to the Chen IDCT algorithm and wherein F comprises a matrix of the received input values; and one or more second multipliers which receive output values from the first multiplier for multiplying the received output values by one or more P matrices to complete the inverse discrete transform on the received one or more DCT F values.

12. A system for multiplying a received input vector with a P matrix in an inverse discrete cosine transform computation according to the Chen algorithm, wherein the received input vector comprises a sequence of received input values, wherein the P matrix comprises an 8×8 matrix comprising 8 rows and 8 columns, wherein the first four columns and the second four columns are symmetric, when distinctions in sign (+/−) values are ignored, with respect to an axis which runs vertically between the fourth and fifth columns, wherein an 8×4 sub-matrix is defined by the first four columns, wherein the sub-matrix comprises eight sub-rows of dimension 1×4, wherein each of said plurality of sub-rows includes at least one unity value, the system comprising:

a sub-row scaling unit comprising one input and four outputs, wherein the received input values are supplied to the one input, wherein the sub-row scaling unit multiplies each received input value by a corresponding sub-row thereby producing a series of scaled sub-rows, wherein the elements of each scaled sub-row are asserted at the four outputs, wherein the sub-row scaling unit further comprises:

a first multiplier for multiplying the received input values by constant values from the second column of the 8×4 sub-matrix;

a second multiplier for multiplying the received input values by constant values from the third column of the 8×4 sub-matrix;

a third multiplier for multiplying the received input values by constant values obtained from either the first or fourth column of the 8×4 sub-matrix, wherein the selection of column depends on the position of the received input value within the received input vector;

wherein the first, second, and third multipliers perform the multiplication of a received input value by a corresponding sub-row, wherein the third multiplier serves to multiply the received input value by either the first or the fourth element of the sub-row depending on which of the first or fourth element is not equal to unity;

wherein, for each of said received input values, said received input value is provided as at least one of the four output values, depending on the location of the unity value within the corresponding sub-row;

an accumulator with four inputs and eight outputs, wherein the accumulator receives each scaled sub-row from the sub-row scaling unit, and performs eight cumulative addition/subtraction operations on the elements of the scaled sub-rows, wherein the eight outputs of the accumulator comprise a collection of eight final results from the eight cumulative addition/subtraction operations;

wherein the eight outputs from the accumulator comprise the vector output of the system, and comprise the matrix product of the received input vector and the P matrix.

13. The system of claim 12, wherein said unity value may be located in various positions in said sub-rows of said 8×4 sub-matrix, the system further comprising:

at least one multiplexer having an input coupled to at least one output of one of said multipliers, wherein said at least one multiplexer includes an input receiving said received input value;

wherein said at least one multiplexer operates to provide an output from the multiplier or the received input value as an output from the sub-row scaling unit depending on the location of said unity value in said sub-row.

14. The system of claim 13, wherein said at least one multiplexer comprises two multiplexers each coupled to an output of one of said multipliers.

15. The system of claim 12, wherein said system is supplied with a plurality of input vectors comprising the row vectors of the matrix:

$(Q \times F^T) \times Q$, wherein the Q matrix is the Q diagonal matrix according to the Chen IDCT algorithm, and wherein F comprises a matrix of received DCT-domain values;

wherein a plurality of output vectors from the system comprise the row vectors of the matrix:

$(Q \times F^T) \times Q \times P$.

16. The system of claim 12, wherein said system is supplied with a plurality of vectors comprising the row vectors of matrix:

$((Q \times F^T) \times Q \times P)^T \times P$, wherein the Q matrix is the Q diagonal matrix according to the Chen IDCT algorithm, and wherein F comprises a matrix of received DCT-domain values;

wherein a plurality of output vectors from the system comprise the row vectors of the matrix:

$((Q \times F^T) \times Q \times P)^T \times P$.

17. The system of claim 12, wherein said system only includes three multipliers.

18. A multiplier for multiplying received input values with a P matrix in an inverse discrete cosine transform computation according to the Chen algorithm, wherein the P matrix comprises a plurality of constants, wherein each of said constants have a binary bit representation, wherein each of said constants have a bit resolution comprising a first number of bits, wherein said constants have a maximum of a second number of one values in said bit representations, wherein said input values have a binary bit representation, wherein each of said input values have a bit resolution comprising a first number of bits, the multiplier comprising:

a plurality of multiplexers for receiving shifted input values; and a second number of adders coupled to receive outputs from said plurality of multiplexers, wherein said second number of adders are operable to perform multiplication on an input value having said bit resolution comprising said first number of bits with one of said constant values having said bit resolution comprising said first number of bits;

wherein said second number of adders corresponds to one less than said maximum of said second number of one values in said bit representations of said constant values.

19. The multiplier of claim 18, wherein said plurality of multiplexers operate to provide selected ones of said shifted values to said second number of adders in order to perform multiplication on an input value having said bit resolution comprising said first number of bits with one of said constant values having said bit resolution comprising said first number of bits.

20. A method for multiplying a received input vector with a P matrix in an inverse discrete cosine transform computation according to the Chen algorithm, wherein the P matrix comprises an 8×8 matrix comprising 8 rows and 8 columns, wherein the first four columns and the second four columns are symmetric, when distinctions in sign (+/−) values are ignored, with respect to an axis which runs vertically between the fourth and fifth columns, wherein an 8×4 sub-matrix is defined by the first four columns, wherein the sub-matrix comprises eight sub-rows of dimension 1×4, wherein each of said plurality of sub-rows includes at least one unity value, the method comprising:

receiving an input vector comprising a sequence of input values;

scaling each sub-row of the 8×4 sub-matrix by a corresponding received input value, thereby producing eight scaled sub-rows, wherein said scaling of each sub-row comprises:

multiplying the received input value by a first constant value which resides in the corresponding sub-row and in the second column of the 8×4 sub-matrix;

multiplying the received input value by a second constant value which resides in the corresponding sub-row and in the third column of the 8×4 sub-matrix;

multiplying the received input value by a third constant value obtained from the corresponding sub-row, wherein said third constant value is an entry of either the first column or the fourth column of the 8×4 sub-matrix, wherein the selection of column depends on which of the first or fourth column entries is not equal to unity;

accumulating the scaled sub-rows by performing eight cumulative addition/substraction operations on the elements of the scaled sub-rows, wherein a collection of eight final results from the eight cumulative addition/ subtraction operations comprise the vector output of the method;

wherein the vector output of the method comprises the matrix product of the received input vector and the P matrix.

* * * * *

UNITED STATES PATENT AND TRADEMARK OFFICE
CERTIFICATE OF CORRECTION

PATENT NO. : 5,781,239
DATED : July 14, 1998
INVENTOR(S) : Venkat Mattela and Srinivasa Malladi It is certified that error appears in the above-identified patent and that said Letters Patent is hereby corrected as shown below:

Claim 1, col. 17, line 49, please delete "first is multiplier" and substitute "first multiplier".

Signed and Sealed this

Twenty-ninth Day of September, 1998

Attest:

BRUCE LEHMAN

Attesting Officer　　　Commissioner of Patents and Trademarks